United States Patent [19]

Bhattacharya

[11] Patent Number: 5,448,742

[45] Date of Patent: Sep. 5, 1995

[54] METHOD AND APPARATUS FOR LOCAL MEMORY AND SYSTEM BUS REFRESHING WITH SINGLE-PORT MEMORY CONTROLLER AND ROTATING ARBITRATION PRIORITY

[75] Inventor: Dipankar Bhattacharya, Santa Clara, Calif.

[73] Assignee: OPTi, Inc., Santa Clara, Calif.

[21] Appl. No.: 885,430

[22] Filed: May 18, 1992

[51] Int. Cl.$^6$ .............................................. G06F 13/00
[52] U.S. Cl. ..................................... 395/481; 395/427; 364/DIG. 1; 364/242.9; 364/242.92; 370/85.6
[58] Field of Search ............................. 395/425, 725; 364/200 MS File, 900 MS File, 242.9, 242.92; 365/222; 370/85.6

[56] References Cited

U.S. PATENT DOCUMENTS

| | | | |
|---|---|---|---|
| 4,719,621 | 1/1988 | May | 370/85 |
| 4,961,167 | 10/1990 | Kumanoya et al. | 365/189.09 |
| 4,987,529 | 1/1991 | Craft et al. | 395/325 |
| 5,175,853 | 12/1992 | Kardach et al. | 395/650 |
| 5,265,231 | 11/1993 | Nuwayser | 395/425 |
| 5,276,888 | 1/1994 | Kardach et al. | 395/725 |
| 5,295,110 | 3/1994 | Sakakibara | 365/222 |
| 5,343,430 | 8/1994 | Furuyama | 365/201 |

OTHER PUBLICATIONS

Intel Corp., *82350DT Eisa Chip Set* (Sep. 1991).
Intel Corp., *82350 EISA Chip Set, Peripheral Components*, Data Book (Jul. 1990).
Texas Instruments Corp., *TACT84500 EISA Chip Set*, Preview Bulletin (1991).
OPTI, Inc., *OPTI-386WB PC/AT Chipset (82C391/82C392/82C206*, Data Book, Version 1.2 (Mar. 28, 1991).
OPTI, Inc., *HiD/386 AT Chipset High Integration Direct Mapped Cache AT 82C381/82C382D-25/33*, Data Book (Nov. 1989).
Edward Solari, *AT Bus Design*, pp. 8-151 through 9-163 (Annabooks: 1990).

*Primary Examiner*—David L. Robertson
*Assistant Examiner*—Frank J. Asta
*Attorney, Agent, or Firm*—Fliesler, Dubb, Meyer & Lovejoy

[57] ABSTRACT

According to the invention, roughly described, the EISA arbitration scheme is used for arbitrating among a plurality of requestors for a system bus, the requestors including the CPU, a refresh controller, EISA devices and ISA/DMA devices. A refresh control signal is asserted if the refresh controller wins the arbitration, and a CAS# before RAS# refresh is performed on local memory in response to the refresh control signal after completion of any CPU access to local memory then taking place. The CPU can continue to access external cache during system bus refresh, and a CPU access to local DRAM is delayed only by the amount of time required for the shorter local DRAM refresh to complete.

51 Claims, 8 Drawing Sheets

METHOD AND APPARATUS FOR LOCAL MEMORY AND SYSTEM BUS REFRESHING WITH SINGLE-PORT MEMORY CONTROLLER AND ROTATING ARBITRATION PRIORITY

BACKGROUND

1. Field of the Invention

The invention relates to the Extended Industry Standard Architecture (EISA) for computer systems, and more particularly, to the execution of a hidden refresh on local memory when an EISA-defined refresh takes place on the system bus.

2. Description of Related Art

The IBM PC AT computer architecture has become industry standard architecture for personal computers, and is typically built around a CPU such as an 80286, 80386 or 80486 microprocessor manufactured by Intel Corporation. The CPU is coupled to a host or local bus, capable of performing memory accesses and data transfers at high rates of speed (i.e., on the order of 10–50 MHz). The host bus includes 16 or 32 data lines, a plurality of address lines, and various control lines. The typical IBM PC AT-compatible platform also includes DRAM main memory, and in many cases cache memory, both coupled to the local bus.

The typical IBM PC AT-compatible computer also includes a system bus which is separate and distinct from the local bus. The system bus is coupled to the host bus via certain interface circuitry. The system bus includes 8, 16 or 32 data lines, a plurality of address lines, as well as control lines. The system bus historically was addressed by the CPU in the CPU's I/O address space rather than its memory address space. The I/O address space is logically distinct from the memory address space and if the CPU desires to access an I/O address, it does so by activating an MIO# signal on the host bus to indicate that this is an access to the I/O address space. The interface circuitry recognizes the I/O signals thereby generated by the CPU, performs the desired operation over the system bus, and if appropriate, returns results to the CPU over the host bus.

In practice, some I/O addresses may reside physically on the host bus and some memory addresses may reside physically on the system bus. The interface circuitry is responsible for recognizing that a memory or I/O address access must be emulated by an access to the other bus, and is responsible for doing such emulation.

In addition to the above elements, a typical IBM PC AT-compatible system includes a DMA controller which permits peripheral devices on the system bus to read or write directly to or from local memory, as well as an interrupt controller for transmitting interrupts from various add-on cards to the CPU. The add-on cards are cards which may be plugged into slot connectors coupled to the system bus to increase the capabilities of the system.

General information on the various forms of IBM PC AT-compatible computers can be found in IBM, "PC/AT Technical Reference Manual", in Sanchez, "IBM Microcomputers: A Programmer's Handbook" (McGraw-Hill: 1990) and Solari, "AT Bus Design" (San Diego: Annabooks, 1990). See also the various data books and data sheets published by Intel Corporation concerning the structure and use of the iAPX-86 family of microprocessors, including the "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). All the above references are incorporated herein by reference.

The original IBM PC-AT computer architecture has spawned several architectural variations which themselves have become standards in the microcomputer industry. These standards include ISA ("Industry Standard Architecture") and EISA ("Extended Industry Standard Architecture"). The EISA architecture is intended to be upward compatible from the ISA architecture, meaning that an add-on card built for ISA should work properly if used in an EISA computer.

The host bus in the various PC-AT compatible architectures includes a plurality of address lines and a plurality of data lines, as well as a number of control lines and power and ground. The exact set of lines which make up the host bus is well known in the industry, and may be determined from various sources, including the references cited above. For present purposes, it is sufficient to identify the following signal lines on the local bus ("#" indicates active low):

| Signal | Description |
| --- | --- |
| HA(23:1) or HA(31:2) | Address lines. For the 80286 and 80386SX, 24 bits of address are provided. The high order 23 bits are provided on HA(23:1). For the 80386DX and 80486, 32 bits of address are available. The high order 30 bits are provided on HA(31:2). |
| HBHE# & HBLE# or HBE#(3:0) | Host Byte High Enable and Host Byte Low Enable, or Host Byte Enables (3:0). For the 80286 and 80386SX, HBLE# can be thought of as equivalent to HA(0) and HBHE# = IBLE#. For the 80386DX and 80486, HBE#(3:0) carries a 1-of-4 decode of the 2 low order address bits. |
| HD(15:0) or HD(31:0) | Data lines. The 80286 and 80386SX operate with a 16-bit external data bus, and the 80386DX and 80486 operate with a 32-bit data bus. |
| M/IO# | Memory/IO control line. When asserted low by the CPU, indicates that the address on HA is an I/O address as opposed to a main memory address. |
| RDY# | Acknowledgment to CPU that a current request has been serviced and CPU can start a new cycle. RDY# always terminates the current cycle, even if it is asserted in the middle of a burst cycle (486 processors only). |
| BRDY# (486 processors) | Analogous to RDY# except that it does not terminate a burst cycle in progress. CPU responds to BRDY# by expecting the next clock cycle to be another data transfer. Up to 16 bytes (in four double words) can be transferred during a burst. The CPU asserts BLAST# to end the burst. |
| BLAST# (486 processors) | CPU asserts BLAST# to indicate that the next BRDY# returned to CPU will be the last in the cycle, whether burst or not. BRDY# wkh BLAST# asserted has the same effect as RDY#. |
| CLK2, CLK or HCLK | CPU clock signal. |
| W/R# | Distinguishes host write cycles from host read cycles. |
| D/C# | Distinguishes host data cycles, either memory or I/O, from host control cycles which are: interrupt acknowledge, halt, and instruction fetching. |
| HADS# | Indicates that a valid bus cycle definition and address (W/R#, D/C#, M/IO#, HBE0#, HBE1#, HBE2#, HBE3# (or HBHE# and HBLE#) and HA) are being driven on the host bus. HADS# is asserted synchronously with a rising edge of CLK and both sampled and withdrawn synchronously |

| | -continued |
|---|---|
| HOLD | with the next rising edge of CLK. Bus hold request. Allows another bus master complete control of the CPU bus. In response to HOLD going active the CPU will float most of its output and input/output pins. HLDA will be asserted after completing the current bus cycle, burst cycle or sequence of locked cycles. The CPU will remain in this state until HOLD is de-asserted. |
| HLDA | Hold acknowledge. Goes active in response to a hold request presented on the HOLD signal pin. HLDA indicates that the CPU has given the bus to another local bus master. HLDA is driven active in the same clock that the CPU floats its bus. HLDA is driven inactive when leaving bus hold. HLDA is active HIGH and remains driven during bus hold. |
| BOFF# | Backoff. When this CPU input signal is asserted, the CPU aborts any cycle currently in progress and floats most of its output and input/output pins (the same pins as those floated during HLDA). The pins remain floated until BOFF# is de-asserted, at which time the CPU restarts any aborted cycle. |
| BREQ# (486 processors) | CPU output indicates that it needs access to CPU bus, or that it is currently using the bus. Used by external logic for arbitration purposes. BREQ is always generated when the processor has a cycle pending, whether or not it is currently driving the bus. It may be asserted during a bus hold (HOLD), bus backoff (BOFF#), or address hold (AHOLD#). After HLDA, the CPU continues executing from its internal cache if it can. Only when it next requires access to the CPU bus does it assert BREQ#. |

The various signals on an EISA system bus are also well specified and well known in the industry. They are described in BCPR Services, Inc., "EISA Specification", ver. 3.11 (1990). For present purposes, only the following signals are important:

| | |
|---|---|
| SA(19:0) | 20 address lines. Sufficient to address 1 MB of memory. Only SA(15:0) are used to address the 64k I/O address space, and only SA(9:0) are used to address the basic 1k AT I/O address space. |
| LA(31:2) | Additional address lines for addressing a 16MB memory address space on the I/O bus. The LA lines are valid earlier in an I/O bus cycle, but must be latched if needed later in the cycle. The SA lines are not valid as early as the LA lines, but remain valid longer. |
| SD(31:0) | 32 data lines. |
| BCLK | I/O bus clock signal. 6–8.33 MHz signal. Usually a square wave, but the EISA standard specification states that a BCLK cycle can be stretched in certain situations in order to ensure that a desired edge of an EISA bus signal occurs synchronously with a desired edge of BCLK. |
| START# | Start a bus cycle. Interface chipset or EISA master activates START# when the address lines LA(31:2) and M/IO are valid. START# terminates in response to the rising edge of BCLK which occurs at least one full BCLK cycle after it was asserted. Sampled on the rising edge of BCLK if necessary. |
| REFRESH# | Indicates that either the system board refresh controller or an external ISA master is performing a refresh cycle on the system bus. |
| DRQ#(7:5,3:0) | Used to request DMA service by a DMA device or an ISA master to gain control of the system bus. Remains active until the last transfer has been started on the system bus. |
| DAK#(7:5,3:0) | Indicate that a request by a DMA device or an ISA master for control of the system bus has been granted. For ISA masters and ISA compatible DMA devices, DAK# remains active until the last transfer has been completed. For EISA devices performing an enhanced DMA, the DAK# trailing edge can occur earlier to indicate a request for bus preemption. |
| MRQ#(5:0) | Used by an EISA master to request control of the system bus. Remains active until the last transfer has been started on the system bus. |
| MAK#(5:0) | Indicate that a request by an EISA master for control of the system bus has been granted. The MAK# trailing edge can occur before the last transfer has been completed to indicate a request for preemption. |
| CMD# | Indicates when data is valid on the SD lines for write cycles. The leading (falling) edge of CMD# must be synchronous with a rising edge of BCLK and occurs at the same time as the trailing edge of START#. It remains active until the end of the cycle and usually, but not always, terminates synchronously with a rising edge of BCLK. |
| MSBURST# | Master Burst. Asserted by an EISA bus master if both the master and the slave are capable of supporting the next cycle as a burst cycle. Sampled on rising edge of BCLK. |
| EXRDY | EISA Ready. De-asserted by an EISA slave when it is not ready to terminate an EISA cycle. Sampled on the falling edge of BCLK after CMD# becomes active. If EXRDY is inactive at that time, EXRDY is sampled again on each BCLK failing edge thereafter. CMD# remains active for at least one-half of a BCLK cycle after EXRDY is sampled active, so this signal is useful for generating an "early ready" signal to the CPU. |
| CHRDY | ISA Channel Ready. De-asserted by an ISA slave before a falling edge of BCLK if the slave will not be ready to terminate an ISA cycle on the next BCLK rising edge. Sampled on the falling edge of BCLK just prior to the BCLK rising edge on which the ISA cycle would otherwise terminate. If CHRDY is low at that time, it is sampled again on each BCLK falling edge thereafter. CMD# remains active for at least one-half BCLK cycle after CHRDY is sampled active, so like EXRDY, CHRDY is useful for logic which generates an "early ready" signal to the CPU. |
| NOWS# | ISA No Wait State slave. Asserted by an ISA slave before a BCLK falling edge to shorten default-length ISA cycles. Sampled on BCLK falling edge and if active at that time, will cause CMD# to go inactive on the immediately following BCLK rising edge. If CHRDY is low at the time NOWS# is sampled active, termination of the cycle is delayed. CMD# will remain active for at least one-half BCLK cycle after NOWS# is sampled active, and so NOWS# can be used in logic to generate an "early ready" signal to the CPU. |

Recently, efforts have been made to reduce the size and improve the manufacturability of PC AT-compatible computers. Specifically, several manufacturers have developed "PC AT chipsets", which integrate a large amount of the system interface circuitry and other circuitry onto only a few chips. An example of such a chipset for ISA microcomputers is the 386WB PC/AT chipset manufactured by OPTi, Inc., Santa Clara, Calif. Examples of such a chipset for EISA microcomputers are described in Intel, "82350 EISA Chip Set" (1990) and in Intel, "82350DT EISA Chip Set" (1992), both available from Intel Corp., Santa Clara, Calif., and incorporated by reference herein. Another example of such a chipset for EISA microcomputers is described in Buchanan, "A Highly Integrated VLSI Chip Set For EISA System Design", Silicon Valley Personal Computer Design Conference Proceedings, Jul. 9–10, 1991, pp. 293–306.

In an EISA-based system, several resources are typically made shareable among various masters. The resources include the system bus, the host bus, and local memory. The EISA standard specifies an arbitration priority for access to the system bus, but leaves it to the designer to determine how and when a device may control the host bus and/or the local memory. In particular, the EISA specification provides for centralized arbitration control to allow sharing of the EISA bus among three groups of requestors, including (1) the CPU or an EISA device; (2) an ISA device or DMA controller; and (3) a refresh controller. A device desiring access to the EISA bus asserts a bus request signal to the centralized arbitration controller, which arbitrates the request and asserts a bus grant signal when the bus is available. Other devices may preempt an active device by asserting a bus request to the centralized arbitration controller, which then negates the then-active bus grant signal to indicate to the active device that it must release the bus. After the active device releases the bus and so indicates by de-asserting its bus request signal, the centralized arbitration controller will assert the appropriate bus grant signal for the next winning device. The EISA specification specifies the maximum delay which the active device may take after its bus grant signal is negated, before the arbitration controller will force it off the bus.

The EISA specification calls for a multi-level rotating arbitration priority. The arbitration scheme gives DMA channels a high level of priority to assure compatibility with traditional ISA add-on cards which can tolerate only a short bus latency. EISA devices have a lower priority and their design must provide for longer latency. The arbitration scheme gives the system bus to the CPU by default when no other device is requesting use of the bus. In addition, the CPU may request EISA bus access when it has a cycle to execute.

FIG. 1 shows the rotating priority scheme prescribed by the EISA standard for devices desiring access to the EISA bus. The top priority level as defined in the EISA specification, as indicated in box 102, uses a three-way rotation to grant bus access sequentially to a refresh controller indicated by box 104, either the CPU or an EISA device as indicated in box 106, and a DMA/ISA device as indicated in box 108. One device from each of the three groups will gain access to the EISA bus at least once in every three arbitration cycles, depending on which devices are requesting service. A device that does not request the EISA bus is skipped in the rotation.

When the centralized arbitration controller grants the bus to the CPU or EISA device as indicated in box 106, the bus is granted to the CPU or an EISA device in a second-level two-way rotation, as indicated in box 110. Further, when an EISA device is granted control of the bus, the particular EISA device chosen is selected according to a third-level six-way rotation of EISA devices as indicated in box 112. If the central arbitration controller grants the EISA bus to a DMA/ISA device at the top level, as indicated in box 108, the particular channel which receives the bus is selected either according to strict numeric priority, as indicated in box 114, or according to a cascaded rotating priority scheme as indicated in boxes 116 and 118. The user of the system programs which scheme is to be used for the DMA/ISA device. If the cascaded rotating priority scheme is chosen, then the selection rotates among channels 5, 6, 7 and a cascade channel (box 116), which when selected rotates among channels 0, 1, 2 and 3 (box 118). Once a DMA/ISA device is selected at the top level of the EISA rotation priority 102, arbitration for the particular channel, as indicated in boxes 114, 116 and 118, is the same as the arbitration scheme for the prior ISA-based computer systems.

One EISA chipset which maintains the EISA priority arbitration sequence for access to the EISA bus is the 82350 chipset manufactured by Intel Corporation, This chipset is described in Intel, "82350 EISA Chipset" (1990), incorporated herein by reference. The central arbitration controller of the 82350 chipset grants access to the EISA bus, the host bus and the local DRAM, all as a single resource. That is, when an EISA device, the refresh controller or a DMA/ISA device wins the arbitration, the chipset issues a HOLD request to the CPU. Only when the CPU acknowledges the HOLD request and responds with an HLDA, does the chipset return a bus grant signal to the winning device. The CPU may continue executing out of cache (depending on the cache design) while the winning device controls the remainder of the system, but cannot perform any cycles to local memory even if the winning device can perform its desired operation entirely on the system bus.

The 82350 scheme is particularly problematical if the winner of the EISA arbitration is the refresh controller. A refresh cycle on the EISA is lengthy by definition, requiring four cycles of a 120 nS bus clock (BCLK) plus arbitration overhead. The CPU cannot access local DRAM or external cache during this period. Such a delay can significantly affect CPU throughput.

A chipset which reduces this problem is the 82350DT chipset, also manufactured by Intel Corporation. The chipset is described in Intel, "82350DT EISA Chipset" (1992), incorporated herein by reference. The 82350DT chipset is a complicated arrangement which can operate either in a concurrent mode or a non-concurrent mode, selectably by the user, and in the concurrent mode can operate with a coupled or decoupled refresh of local DRAM, also selectably by the user. In the non-concurrent mode, as in the 82350 chipset, the CPU is held during the time that a device winning the EISA arbitration is granted access to the EISA bus. In concurrent mode, the CPU is not held when another device is granted control of the EISA bus. Instead, an 82359 memory controller monitors the EISA bus address lines and arbitrates for control of the local DRAM only when the device that won the EISA arbitration actually requires the local DRAM. In this way, the 82359 memory controller simulates dual port access (one port receiving the host bus address and one port receiving the EISA bus address) to local DRAM.

If the winning device is the EISA refresh controller, (or if an ISA device asserts REFRESH#), the EISA bus REFRESH# signal will go low. In either the concurrent on non-concurrent modes, when the 82359 operates in coupled refresh mode, the 82359 monitors the EISA bus REFRESH# to perform a local DRAM refresh cycle at the same time that refresh is executed on the EISA bus. When REFRESH# goes active, the 82359 arbitrates for ownership of the local memory, and when obtained, performs the local DRAM refresh using its own internally generated refresh address. The 82359 pulls the EISA bus EXRDY signal low until the local DRAM refresh completes, to prevent any new cycle from beginning.

Accordingly, in concurrent, coupled refresh mode, the CPU is never held when a device other than the CPU wins the EISA arbitration. When the CPU needs access to the local DRAM or system bus for reading or writing, the CPU has to wait until the refresh cycle on the system bus and the local DRAM are complete. Also, the refresh cycle on the system bus is extended (by de-asserting EXRDY) until the slower local DRAM refresh completes. This causes a further delay for any pending EISA/ISA/DMA master cycles as well as any CPU cycles to local DRAM or the system bus.

In concurrent, decoupled refresh mode, the 82359 ignores the REFRESH# signal on the system bus. Instead it uses an internal refresh timer which arbitrates local DRAM away from the current owner when a local DRAM refresh is needed. It uses a RAS# only refresh scheme which is faster than the system bus refresh and approximately as fast as a CAS# before RAS# refresh. This minimizes the delay for any pending EISA/ISA/DMA master cycle to host memory, and any CPU cycle to local DRAM or the system bus. However, concurrent decoupled refresh mode can not be used in the 82350DT chipset when an ordinary, single-ported, cache controller is connected to the host bus.

Many DRAMs support a fast "CAS# before RAS# refresh" function. In a CAS# before RAS# refresh, external circuitry merely activates the CAS# line before the RAS# line. No address need be provided. Neither the 82350 nor the 82350DT chipset takes advantage of fast CAS# before RAS# refresh capability of many DRAMs. Certain ISA chipsets, however, such as the OPTi 386WB chipset, do. In the ISA priority arbitration sequence, the CPU has the lowest priority and DMA/ISA devices share the highest priority with the refresh controller on a first-come, first-served basis. In the 386WB chipset, if a DMA/ISA device wins the arbitration, the chipset asserts DHOLD to the CPU and when the CPU responds with DHLDA, the chipset grants control of all three systems resources (ISA bus, CPU bus and local memory) to the winning DMA/ISA device. If the refresh controller wins the arbitration, however, then the CPU is not held. Instead, a refresh cycle is performed on the ISA bus only. The DRAM controller monitors the ISA refresh line and, in response to a falling (leading) edge, performs a CAS# before RAS# refresh of the local DRAM. The DRAM controller delays BRDY# to the CPU if a CPU to DRAM cycle must be delayed. The EBC delays RDY# to the CPU if a CPU to system bus cycle is delayed because of the refresh taking place on the ISA bus. The CPU can continue to access external cache during the entire refresh cycle, and need not wait long for access to local DRAM since the local DRAM refresh is faster than the system bus refresh.

However, avoiding the cost of a dual-ported DRAM controller and simply following the former ISA priority arbitration sequence would violate the EISA arbitration sequence and thereby risk incompatibility with newly developed EISA hardware.

SUMMARY OF THE INVENTION

Accordingly, it is an object of the present invention to reduce CPU latency by allowing the CPU access to the external cache and local DRAM during a refresh cycle on the system bus.

It is another object of the invention to allow CPU access to local DRAM during a refresh cycle on the system bus, while using only a single-ported address path to local DRAM rather than a more expensive dual-ported address path to local DRAM.

According to the invention, roughly described, the EISA arbitration scheme is used for arbitrating among a plurality of requestors for a system bus, the requestors including the CPU, a refresh controller, EISA devices and ISA/DMA devices. A refresh control signal is asserted if the refresh controller wins the arbitration, and a CAS# before RAS# refresh is performed on local memory in response to the refresh control signal after completion of any CPU access to local memory then taking place, and the CPU is not held.

BRIEF DESCRIPTION OF THE DRAWINGS

The invention will be described with respect to particular embodiments thereof, and reference will be made to the drawings, in which.

DETAILED DESCRIPTION

System Overview

Figure 2A:
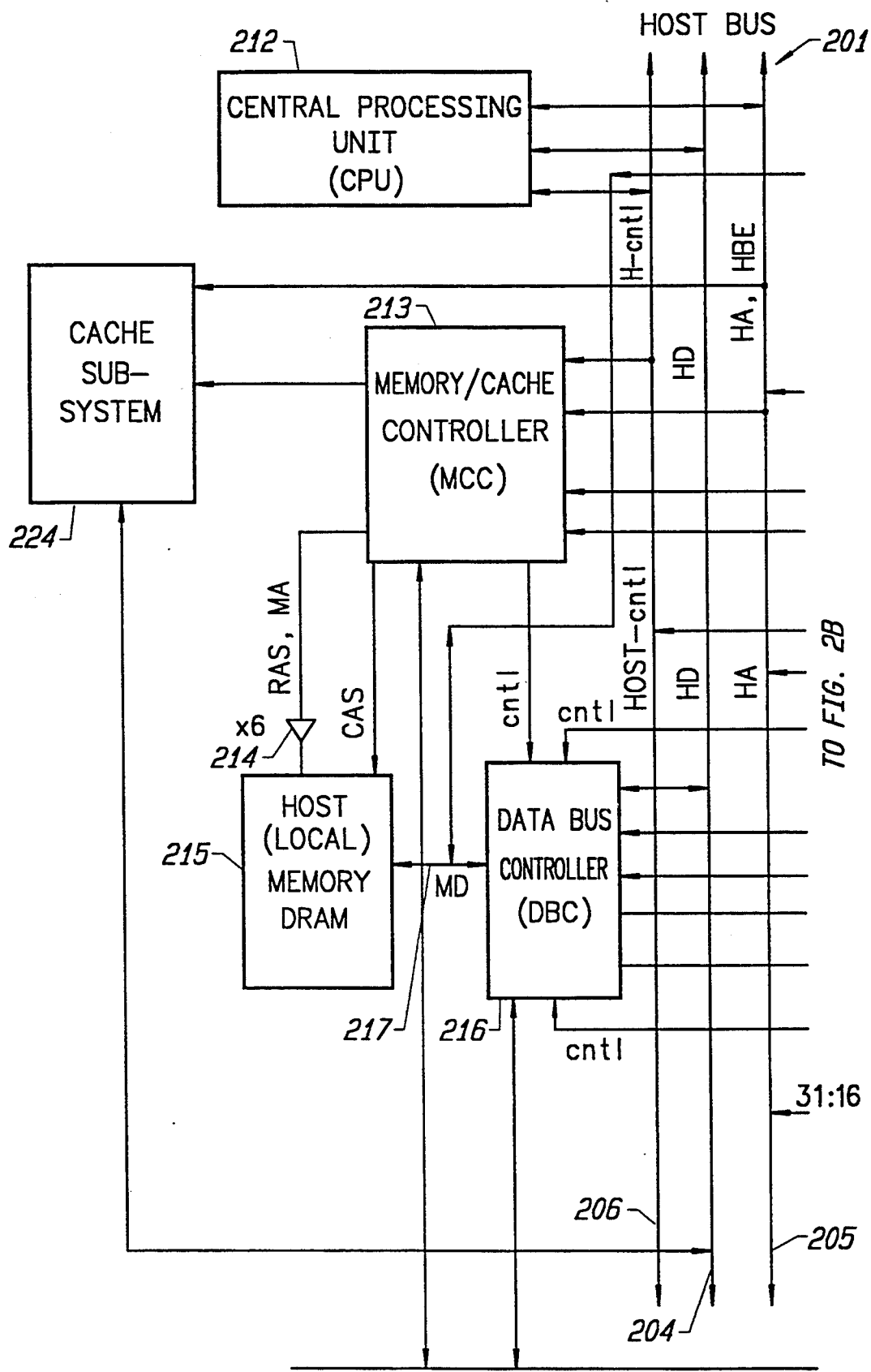
FIG. 2 is a simplified block diagram of a computer system which may incorporate the invention.
Figure 2B:
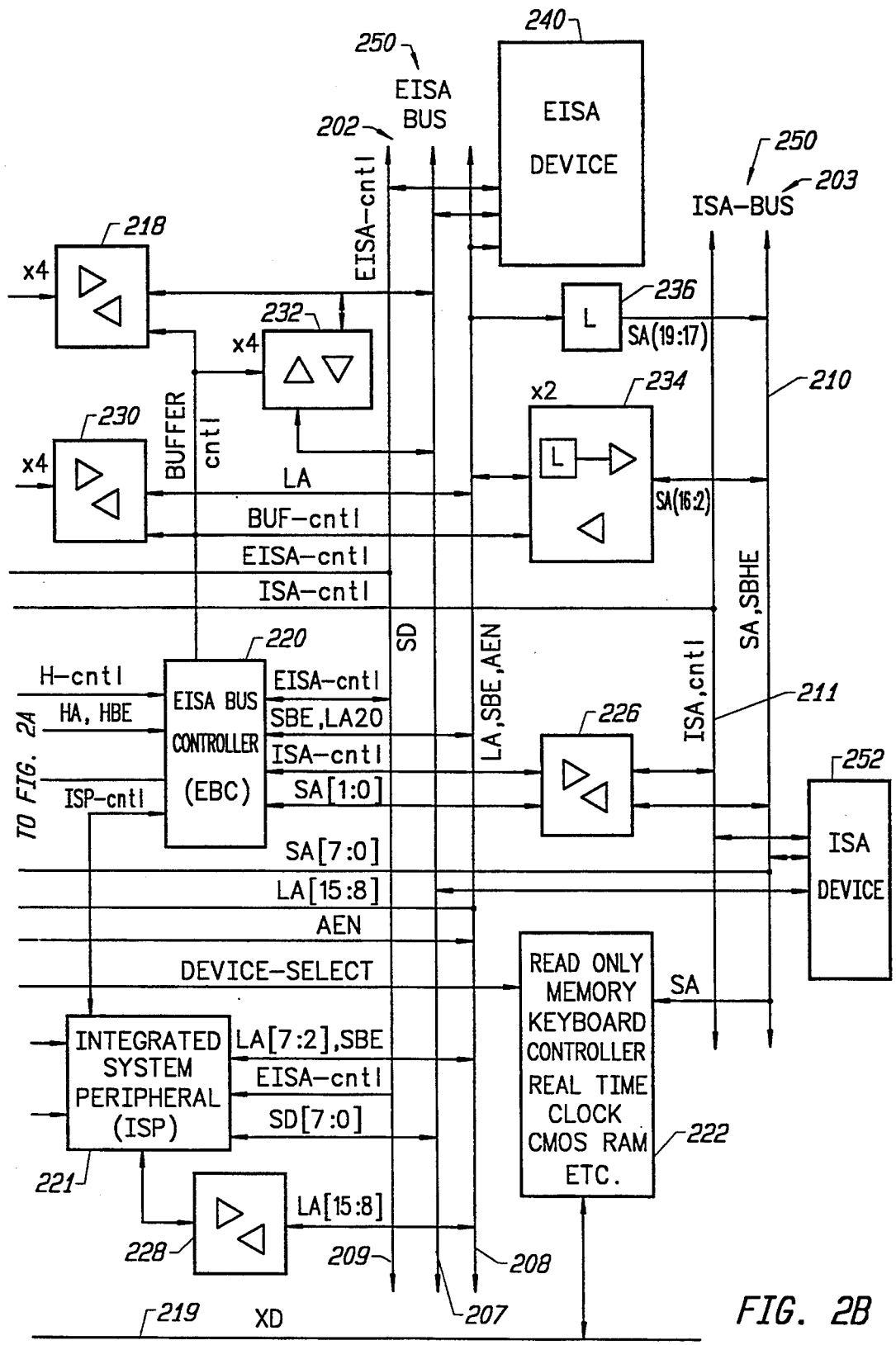

FIG. 2 is a block diagram of important features of an EISA-based microcomputer system which may incorporate the invention. It comprises a host bus 201, an EISA bus 202, and an ISA bus 203. The host bus 201 includes HD data lines 204, HA and HBE address lines 205, and a plurality of control lines 206. The EISA bus 202 includes SD data lines 207, LA, SBE and AEN address lines 208, as well as EISA control lines 209, and the ISA bus 203 includes SA address lines 210 and ISA control lines 211. The ISA bus 203 does not include any data lines since such lines would be duplicative of the SD lines 207 on EISA bus 202. Together, the EISA bus 202 and the ISA bus 203 form what is sometimes referred to herein as the system bus 250.

A CPU 212, such as an Intel 80486, as well as an optional numeric coprocessor (not shown), are coupled to the address, data and control lines of host bus 201. The address and control lines of host bus 201 are also connected to a memory/cache controller (MCC) 213, which is also connected to the EISA control lines 209 and to the ISA control lines 211. The MCC 213 provides memory address and RAS information via buffers 214 to a DRAM array (host memory) 215, as well as providing CAS information to DRAM 215. The data lines of DRAM 215 are coupled over an MD bus 217 to a data bus controller (DBC) 216, which is also coupled via bi-directional buffers 218 to the SD data lines 207 of EISA bus 202. The DBC 216 is also connected to the HD data lines 204 of host bus 201 bi-directionally, and is connected to receive SA(7:0) from the address lines 210 of the ISA bus 203 and LA(15:8) from the address lines 208 of EISA bus 202. DBC 216 generates eight AEN signals for EISA bus 202. Both the MCC 213 and the DBC 216 communicate bi-directionally with an 8-bit XD data bus 219. The DBC 216 receives control signals from the MCC 213, an EISA bus controller 220 (discussed below), and an integrated system peripheral 221 (discussed below). The DBC 216 also provides device select signals to a plurality 222 of 8-bit devices, the data lines of which are coupled to the XD bus 219. The plurality 222 can include a read-only memory (ROM), a keyboard controller (KBC), a realtime clock (RTC), CMOS RAM (CRAM), among other things. The system of FIG. 2 also includes a cache subsystem 224 which is coupled to the HA address lines 205 of host bus 201, to the MCC 213, and to the HD data lines 204 of host bus 201.

The system further includes the EISA bus controller (EBC) 220 mentioned above, which is further coupled to the host bus 201 control lines 206 and the HA20 and HBE address lines, and to the EISA bus 202 control lines 209 and LA20 and SBE address lines. The EBC 220 is also coupled via bi-directional buffers 226 to the ISA bus 203 control lines 211 and the SA(1:0) and SBHE address lines 210. The EBC 220 further provides and receives control signals to/from the integrated system peripheral 221.

The integrated system peripheral (ISP) 221 is coupled to host bus 201 address lines HA(31:16), XD data bus 219, and EISA bus 202 control lines 209, data lines SD(7:0), and address lines LA(7:2) and SBE. ISP 221 is further coupled via bi-directional buffers 228 to EISA bus 202 address lines LA(15:8).

The HA address lines 205 of host bus 201 are coupled via bi-directional buffers 230 to the LA address lines 208 of EISA bus 202. Bi-directional buffers 232 are coupled to SD data lines 207 of the EISA bus 202 for the purpose of swapping data bytes. The LA(16:2) address lines of EISA bus 202 are further coupled to provide information via a latch and buffer 234 to the SA(16:2) address lines of ISA bus 203, which in turn are coupled via a buffer in the latch/buffer 234 to provide information to the LA(16:2) address lines of EISA bus 202. An additional latch 236 couples the LA(19:17) address lines of EISA bus 202 to the SA(19:17) address lines 210 of ISA bus 203. The EBC 220 generates control signals for the buffers. 218, 230 and 232 and latch/buffer 234. An EISA device 240 is also shown coupled to the address, data and control lines of EISA bus 202. An ISA device 252 is shown coupled to the address and control lines of ISA bus 203 and to the system bus data lines 207.

The EBC 220, MCC 213, ISP 221 and DBC 216 are, respectively, 82C681, 82C682, 82C686 and 82C687 chips available from OPTi, Inc., Santa Clara, Calif. These chips are incorporated by reference herein, as is the databook publication "OPTi-386/486 WB EISA Chipset" (1991) describing these chips. Details of the OPTi EISA chipset other than as set forth herein are generally not important to an understanding of the invention and therefore will not be described.

Table I describes the signal connection pins of MCC 213. In these tables, the second column indicates the directions of the pin as follows: I=input; O=output; B=both; T=three-statable. Also, as used herein, the '#', 'N' and 'B' suffixes on signal names all generally indicate active low.

TABLE I

| CLOCK AND RESET | | |
|---|---|---|
| CLK | I | Host Clock. Master single-phase CPU clock driven from an external clock-generator circuit. In 486 based systems, it is the same signal that the CPU receives. In 386 systems, it is the single-phase version (half the frequency) of the CPU clock. |
| CLK2 | I | Clock2. This input is driven from an external oscillator circuit without any external division. In systems at or below 33 MHz, this clock signal input is twice the CPU's rated frequency. This is the same clock signal that drives the CPU in 386 systems. CLK2 is used for CAWE(3:0)# generation if the cache's Early Write Enable feature is turned on (Reg C31h<0> is set). |
| RST# | I | Reset. RST# is an input from the EBC that resets the MCC (this same reset signal is also connected to the ISP, DBC, and 8042). The EBC asserts this signal based on powergood and reset switch functions. |
| Address/Status | | |
| HA(31:2) | I | Host Address Bus. Connected to the Host CPU A(31:2) bus. The MCC uses these 30 address lines for internal memory decoding and to generate the memory address bus (MA(11:0)).and the low order cache addresses (CAA3_(1:0), CAA2). The HA(31:2) bus is also used to determine all MCC internal register decodes. |
| GATEA20/TSEL | I | GATEA20 or Test Mode Select. This input pin serves two functions. Normally, it serves as the GATEA20 input from the keyboard controller (Output P21 of the 8042). This input, along wkh the internal Fast GATEA20 register (Reg C30h<0>), is used to generate A20M#. The second function of this pin is to allow the MCC to enter its Tristate test mode. The MCC will enter this test mode when GATEA20/TSEL is sampled High AND GT1M#/TMOD# is sampled low at the trailing edge of RST#. |

TABLE I-continued

| | | |
|---|---|---|
| A20M# | O | A20 Mask. This output determines whether Host Address A20 should be forced low (to emulate the address wraparound at 1MB on the 8086). 486 based systems receive this signal directly (because of their internal cache). 386 systems require the masking to take place externally, so for these systems, A20M# is connected to the A20M# input of the EBC. |
| HBE(3:0)# | I | Host Byte Enables (3:0). Connected to Host CPU BE(3:0)#. These signals determine valid bytes during DRAM/cache writes and MCC internal register accesses. |
| HM/IO# | I | Host Memory/IO#. Connected to Host CPU M/IO#. This is sampled at the same time as HA(31:2). This signal is not used by ISA Masters. |
| HD/C# | I | Host Data/Control#. Connected to Host CPU D/C#. This is sampled at the same time as HA(31:2). |
| HW/R# | I | Host Write/Read#. Connected to ISP & Host CPU W/R#. This is sampled at the same time as HBE(3:0)# except for ISA masters, when it is not used. |
| Host Interface | | |
| 386/486# | I | CPU Select. Hardware strapping pin to distinguish between 386 and 486 systems. |
| HADS# | I | Host Address Status. Connected to Host CPU ADS#. This is sampled at the rising edge of CLK, and when active, indicates valid address/status on the host address bus. |
| BLAST#/ EBCRDY# | I | Burst Last or EBC 386Ready. The function of this pin is determined by the processor type. For 486 systems, this is the BLAST# signal from the CPU and is sampled on the rising edge of CLK except in T1 and the first T2. In 386 systems, this is connected to the HRDY0# signal from the EBC. The MCC internally OR's this signal along with any coprocessor ready signal to produce the BRDY# output, which is fed to the 386 CPU. |
| RDYI#/ 387RDY1# | I | 486 Ready In or 387 Ready1. The function of this pin is determined by the processor type. It is directly connected to the RDY# pin of the CPU for 486 systems and is used by other devices to indicate the end of the current cycle. In most 386 systems, RDYO# from the 387/3167 must be cascaded through the MCC. In this case, 387RDY1# is connected to READYO# from the numeric coprocessor. In all other 386 systems, this pin is left floating (a weak internal pull-up is provided). |
| 387RDY2# | B | 387 Ready2. This pin is unused and should be tied high in 486 systems. In most 386 systems, RDYO# from the 387/3167 is cascaded through the MCC via 387RDY1#. In this case, 387RDY2# should be pulled high. In the special case where the 387/3167 READYO# is OR'D externally with the MCC's BRDY#, the READYO# from the coprocessor should be connected to 387RDY2# and 387RDY1# should be left unconnected. This second case is not recommended above 25 MHz. |
| BRDY# | B | Burst Ready. This signal is connected to the BRDY input of the 486 or to the READY# input of the 386. The MCC drives this line active (low) to indicate the end of a host CPU to local memory cycle. After being active, it is driven high (inactive) for one clock and then tristated. In 386 systems, it is also driven low for a CLK after EBCRDY# or 387RDY# is sampled active. |
| Arbiter | | |
| HHLDA | I | Host Hold Acknowledge. Connected to HHLDA from the host CPU. This indicates an EISA/ISA/DMA/Refresh access. |
| EMSTR16# | I | ISA Master. This input, from the ISP, indicates that an ISA master is in control of the Host/EISA bus. |
| MCCRDY | O | MCC Ready. This normally active (high) signal goes inactive (low) when a hidden refresh cycle is pending and returns active when the refresh cycle is over. It is connected to the EBC MCCRDY input. |
| Bus Interface | | |
| BCLK | I | EISA BCLK. EISA system clock. Connected from BCLK of the EISA connectors. |
| START# | I | Start. This input indicates the beginning of an EISA/DMA/Refresh access and is connected to START# of the EISA connectors. |
| CMD# | I | Command. Provides timing control within an EISA |

TABLE I-continued

| | | |
|---|---|---|
| | | cycle. Connected to CMD# of the EISA connectors. |
| MSBURST# | I | Master Burst. This input is sampled at the rising edge of BCLK and indicates that an EISA burst mode transfer should be carried out. It is connected to MSBURST# of the EISA connectors. |
| REFRESH# | I | Refresh. Connected to REFRESH# of the EISA connectors. The leading edge of MRDC# is interpreted as a request to perform hidden refresh when this signal is active. |
| MRDC# | I | Memory Read Command. The MCC uses this input to indicate a DRAM/Cache read from a master device (EMSTR16# active). Also, when REFRESH# is active, the leading edge of MRDC# is interpreted as a request to perform hidden refresh. Connected to MRDC# of the EISA connectors. |
| MWTC# | I | Memory Write Command. When EMSTR16# is active, the leading edge of MWTC# is used to start a DRAM/cache write. Connected to MWTC# of the EISA connectors. |
| Decode | | |
| HKEN# | O | Host cache enable. Connected to the KEN# of the 486. It is based on a decode of HA(31:17) and will be active for cacheable regions of memory. This signal is forced active from the end of a CPU cycle to the end of the first T1. |
| HLOCM# | O | Host Local Memory. Inhibits EISA/ISA cycle if active during a local Host master cycle. Connected to HLOCM# of the EBC. |
| GT1M#/TMOD# | B | Greater than 1MB or Test Mode. This pin serves two functions. This signal uses HA(31:20) and A20M# to decode memory accesses above 1MB (inactive for accesses in the 000XXXXXh range). It is connected to GT1M# of the EBC. The second function of this pin is to force the MCC into test mode. The MCC will enter its test mode when this pin is sampled low on the trailing edge of RST#. GATEA20/TSEL must be high at this sample point for the Tristate test mode to be entered. A weak internal pull-up keeps GT1M#/TMOD high during RST# if no outside source/tester is driving it. |
| ROMCS0# | O | ROM Chip Select 0. During normal operation, it goes active when FFFFXXXXh or FXXXXh is decoded from HA(31:16). It is connected to CS# of the BIOS ROM. |
| ROMCS1# | O | ROM Chip Select 1. ROMCS1# decodes a 16K/32K/64K block in the range C0000h through EFFFFh based on the value programmed into the MCC's ROM/Shadow RAM index registers (C36h-C3Fh). |
| DRAM Interface | | |
| MA(11:0) | O | Multiplexed DRAM addresses. This bus provides row and column address information to the DRAMs. External buffering is typically required. Note that for EISA master accesses, the HA bus should drive the MA through transparent latches. |
| RAS#(3:0) | O | Row Address Strobes. Each RAS output coresponds to one DRAM bank of four bytes. |
| CAS3#(3:0) CAS2#(3:0) CAS1#(3:0) CAS0#(3:0) | O | Column Address Strobes. CAS0#_(3:0) connects to byte lanes 3 thru 0 of DRAM bank-0. Similarly, each set of four CAS lines corresponds to a particular 4-byte bank. To guarantee EISA memory access timing, these CAS signals should be connected directly (without external buffering) to the local memory DRAMs. |
| WE# | O | Write Enable. This signal is externally buffered to drive the WE# input of the DRAM's. WE# transitions with similar timing to RAS(3:0)#. |
| Cache Interface | | |
| TAG27/18 TAG26/17 TAG25/16 TAG(24:19) | B | Cache Tag Data Bus. Connected to the tag SRAM data bus. The tag number corresponds to the Host address line that it will be compared against. The tag bus is always 9 bits wide. For CPU accesses, the tag bits are sampled at the falling edge of CLK in the first T2. For EISA/DMA, they are sampled at the rising edge of BCLK30. For ISA masters, they are sampled at the leading edge of MRDC# or MWTC#. |
| TAGWE# | O | Tag Write Enable. Connected to tag SRAM WE#. This signal is active during CPU read-miss cycles when the cache gets updated. |
| DIRTY | B | Dirty bit. The dirty bit indicates whether the data in the cache has been modified. It is sampled on the rising edge of CLK on the first T2 of a CPU read miss cycle. It is connected to the data pin of the dirty-bit |

TABLE I-continued

| | | |
|---|---|---|
| | | SRAM. |
| DIRTYWE# | O | Dirty bit Write Enable. This signal goes active when the host CPU writes into the cache. It is connected to the WE# pin of dirty-bit SRAM. |
| XCA30E# | O | External Cache address 3 Output Enable. Allows the CPU address lines HA2 and HA3 to drive the cache SRAM. Connected to the OE# of the buffer between HA2, HA3 and CAA3(1:0), and CAA2. |
| CAA31 | O | Cache Altered Address 3 (odd). Connected to cache bank-1 A3 for the 486 and to A3 of the entire cache for the 386. |
| CAA30 | O | Cache Altered Address 3 (even). Connected to cache bank-0 A3 for 486 systems. |
| CAA2 | O | Cache Altered Address 2. Connected to the cache address line A2. |
| HACALE | O | HA bus to CA bus Latch Enable. This output provides the proper control timing to the latches that create the cache address bus CA(18:4) from the HA bus. This normally active signal goes inactive at the end of a host write or EISA/DMA access to provide sufficient hold time on the CA bus. |
| CACS#(1:0) | O | Cache Memory Chip Selects. Connected to cache-memory CS# for odd & even banks respectively. These outputs are dependent upon the DRAM size, shadow-control, and cache mode bits. When the cache is interleaved (486), these normally active signals go inactive when there is a cache write to the opposite bank of cache. |
| CAOE# | O | Early Cache Output Enable. This signal functions as an output enable for the cache SRAMs with slightly earlier timing than CDOE# and with fewer decoding restrictions. It is typically unused. |
| CAWE(3:0)# | O | Cache Write Enables. Connected to cache-memory WE# pins for byte lanes 3 thru 0. These signals are derived from CLK2 if the MCC's Early Write Enable feature is set (Reg C31 <0>= 1). |
| Data/Parity | | |
| CDOE(1:0)# | O | Cache Data Output Enable. Used to enable data from the cache SRAM onto the local HD bus. For 486 systems, CDOE0# is always controls the low cache data SRAM bank and CDOE1# is used for the upper bank only when cache interleaving is selected (64k/256k cache size). For 386 systems, either signal can be used. In both cases, CDOE# will go high when HA31 is high. |
| XD(3:0) | B | X-Data Bus. The MCC uses the low order nibble of the XD bus to provide the programming data for its internal registers. The upper four bits are ignored during I/O programming cycles to the MCC. |
| MDHDOE# | O | Memory to Host Data Output Enable. This control signal enables instructs the DBC to enable data from the MD onto the HD bus for CPU DRAM reads. It is connected to MDHDOE0# of the DBC. |
| MDHDCLK | O | MD/HD Clock. This normally high signal is the clock used by the DBC's internal master-slave flip-flop between MD and HD busses. It is similarly used to clock the MP bits for parity checking. This signal should be connected to MDHDCLK of the DBC |
| HDMDLE# | O | HD/MD Latch Enable. This normally active signal goes inactive during cache write-back cycles for one CLK when CAS# goes active. It is connected to HDMDLE# of the DBC. |
| HDMDOE# | O | HD/MD Output Enable. This signal enables the HD bus onto the MD bus and is active for all CPU memory writes except cache hit cycles. It is connected to HDMDOE# of the DBC |
| PAREN# | O | Parity Enable. PAREN# provides a timing pulse to the DBC after valid DRAM data has been read into the DBC. This pulse is used as the timing strobe to check for parity errors. It is connected to PAREN# of the DBC. |
| EISA-Timing Signals | | |
| BCLK15 | I | BCLK-15. 15ns delayed version of BCLK from the external delay line. |
| BCLK30 | I | BCLK-30. 30nS delayed version of BCLK from the external delay line. |

The EBC 220 is capable of operation in both 386 and 486 mode. It generates the EISA bus clock (BCLK) as well as the keyboard clock while also providing board level and CPU/Coprocessor reset signals. In addition, the EBC controls the interface between the EISA bus and the Host bus and arbitrates between CPU and refresh requests for the EISA bus. It directs the steering logic of the DBC 216 and the ISP 221 and provides latch/buffer controls for address/data byte lane translation/swapping. Additionally, it provides the address translation between masters and slaves for addresses A20 and A(1:0).

The EBC interfaces directly with the local CPU 212 on the Host bus 201. This interface is used to track host bus cycles when the CPU 212 or other local device is the current master on the host bus 201. When a host cycle is initiated, the EBC 220 determines whether any local slave is responding. If a local device is not the target of the cycle, then the EBC 220 will activate its EISA/ISA interface logic to complete the instruction. The EBC 220 waits until the completion of the EISA/ISA portion of the cycle before terminating the cycle on the host bus 201. If necessary, the EISA/ISA interface will perform multiple cycles (assembly/disassembly) for a single host cycle. When the translation is completed, the host interface is informed to terminate the cycle on the local bus. This also informs the host interface that the host can change the address for the next cycle.

The EISA/ISA interface of EBC 220 monitors cycles initiated by EISA or ISA masters or the ISP DMA controller and watches the system and host buses to detect a slave response. The correct cycle will then be generated on the responding slave's bus. The EBC also generates refresh cycles on the system bus in response to cycles initiated by the refresh controller in the ISP.

The EBC 220 also controls the data buffers 218 and 230 and provide the latching clocks and output enables used by the steering logic in the DBC 216 and the ISP 221.

The control lines CPY01#, CPY02#, CPY03#, CPY13#, and CPYUP are used in the data bus assembly/disassembly logic when a master and slave are different widths. These signals connect directly to external transceivers.

The LA/SA, and LA/HA address steering is accomplished with external buffers and latches. The EBC 220 provides the control signals to direct this address logic.

The EBC is responsible for generating EISA bus compatible cycles including bursting to and from the EISA bus. Bus cycle compatibility is maintained by controlling bus translations and address/data latching for the following cases as well as any cycle involving mismatched source and destination sizes: Host master to an EISA/ISA/ISP slave; EISA master to an ISA/ISP slave; 32-bit EISA master to a 16-bit EISA slave; ISA master to an EISA slave; DMA from EISA/ISA memory; Refresh to EISA/ISA memory; and EISA/ISA/DMA accesses to a Host slave.

Table II describes the external pin connections of the EBC 220.

TABLE II

| Name | Direction | Description |
|---|---|---|
| Host Bus Interface | | |
| 386/486# | I | CPU Select. Hardware strapping pin to distinguish between 386 and 486 Host CPUs. Tied high for a 386 Host and low for a 486 Host. |
| HADS# | I | Host Address Strobe. A host initiated bus cycle is started from the EBC after HADS# has been sampled low and then high. Connected to ADS# from the host CPU. |
| HD/C# | B | Host Data/Control. The CPU drives this signal during host originated cycles and the EBC decodes HD/C# (along with HW/R# and HM/IO#) to determine the type of cycle in process. The EBC drives this line high during EISA/ISA/DMA master cycles. HD/C# is connected to the Host CPU D/C# pin. |
| HW/R# | B | Host Write/Read. The EBC treats this signal as an input during Host CPU and DMA cycles and decodes it (along with HD/C# and HW/R#) to determine the cycle type in process. HW/R# becomes an output during master cycles based on SW/R# for EISA masters and on MWTC# or IOWC# for ISA master cycles. This signal is connected to the ISP HW/R# pin and the CPU W/R# pin. |
| HM/IO# | B | Host Memory/IO. The CPU drives this signal during host originated cycles and the EBC decodes HM/IO# (along with HW/R# and HD/C#) to determine the type of cycle in process. The EBC drives line this during master cycles based on SM/IO# for EISA masters and based on IORC# or IOWC# for ISA masters. This signal is driven high during DMA cycles. HM/IO# is connected to the Host CPU's M/IO# pin. |
| HHOLD | O | Host Hold. This signal is driven active when synchronized DHOLD or SLOWH# are active. It is also driven high during normal refresh cycles when Hidden Refresh is disabled (Reg C11h<0> =0 or C30h<1> =0). HHOLD is connected to the Host CPU's HOLD input. |
| HHLDA | I | Host Hold Acknowledge. This is the acknowledgement from the CPU that it has given up the Host bus in response to HHOLD. The EBC uses this signal to generate RDHLDA to the ISP and the DBC. It is connected to the Host CPU's HLDA pin. |
| WCS# | I | Weitek Chip Select. Typically used to decode a local coprocessor such as the Weitek 3167 or 4167. If sampled active, the EBC assumes a local bus cycle |

TABLE II-continued

| Name | Direction | Description |
|---|---|---|
| | | is in process and inhibits the generation of EISA/ISA cycles. It is only sampled during Host initiated cycles. Typically connected to MCS# from the 3167/4167. |
| HLOCM# | I | Host Local Memory. This input tells the EBC that the accessed memory is local to the Host. During Host initiated memory access, this signal is sampled with the same timing as WCS# for 20/25/33 MHz systems and one CLKIN later otherwise. If active, the EBC inhibits the generation of an EISA/ISA memory cycle. During non Host initiated memory cycles, if HM/IO# is high, it is sampled at the same time as EX32# and the EBC assumes a 32-bit EISA memory access to the Host bus. HLOCM# is connected to the HLOCM# output of the MCC. |
| HLOCDEV# | I | Host Local Device. Local devices on the Host bus must drive this signal to inform the EBC that they are claiming the cycle in progress. During Host initiated cycles, this signal is sampled at the same time as HLOCM#. If active, the EBC assumes a local cycle and inhibits the generation of an EISA/ISA cycle. During all other memory or I/O cycles, HLOCDEV# is sampled at the same time as EX32# and if active, the EBC assumes a 32-bit EISA device on the Host data bus. It is connected to the decoding logic of any local device. |
| NPRDY# | I | Numeric Processor Ready. This input samples the numeric coprocessor's ready output pin and is tied directly to the 387/3167/4167/487SX READYO# pin. |
| LOCRDY# | I | Host Local Ready. An additional ready input for local devices in 486 mode. This pin has a weak internal pull-up and may be left unconnected. Its timing is similar to NPRDY#. |
| HRDYO# | O | Host Ready Out. For 486 systems, this pin is connected to the CPU's ready input. For 386 systems, this pin is connected to the MCC's ready input (BLAST#/EBCRDY#). The EBC drives this line low for one CLKIN at the end of all host-CPU cycles unless HLOCM#, WCS# or HLOCDEV# indicate a host-bus device. The EBC will also drive HRDYO# active (low) after NPRDY is sampled active as well as during 387 cycles when the coprocessor is not present. After driving HRDYO# low, the EBC will drive this signal high for one CLKIN cycle before tristating it to help the external pull-up resistor guarantee proper voltage levels to the CPU. |
| DELRDY | I | When tied low, this pin indicates standard HRDYO# timing. When tied high it indicates that HRDYO# is to be generated one CLKIN earlier than normal, where possible. |
| HLOCK# | I | Host Bus Lock. The CPU drives this pin to indicate that the current bus cycle is locked. This is used to generate SLOCK# for the EISA bus. HLOCK# is connected to the MCC HLOCK# pin and the CPU LOCK# output. |
| Host-Bus/Numeric Processor Interface | | |
| BREQ/HA31 | I | 486 Bus Request or 386 Host Address A31. The function of this pin is determined by the CPU installed. For 486 systems, it indicates that the 486 is requesting control of the Host bus. The EBC uses this signal to generate CPUMISS#. In 386 systems, HA31 allows the EBC to decode 387 accesses at the top of I/O space. This signal is connected directly to the corresponding pin of the appropriate CPU. |
| HKEN#/ NPBUSY# | I | Host Cache Enable or Numeric Coprocessor Busy. The function of this pin is determined by the CPU installed. For 486 systems, HKEN# is connected to the 486 KEN# pin and is sampled to override HBE(3:0)# during 486 reads. For 386 systems, NPBUSY# is connected directly from the coprocessor and is used to generate 386BUSY#, 386PEREQ and NPINT. Connected to 486 KEN# or 387 BUSY#. |
| NPERR | I | Numeric Coprocessor Error. For 486 systems, it is connected to the 486 or 487SX FERR# output and is used to generate IGERR# and NPINT. For 386 systems, this signal is connected the 387 ERROR# output and is used along wkh NPBUSY# to generate 386BUSY#, 386PEREQ and NPINT. It is also used to detect the presence of a 387 while the RSTCPU |

TABLE II-continued

| Name | Direction | Description |
|---|---|---|
| | | signal is active. This information is passed on to the processor via the 386ERR# signal. |
| WINT/NPPEREQ | I | Weitek Interrupt or Numeric Coprocessor Extension Request. In all 486 systems, and in those 386 systems with a 3167 or 4167 numeric coprocessor installed, this input is connected to the numeric coprocessor's interrupt signal (INTR). The EBC uses WINT in the logic that generates the numeric processor interrupt output (NPINT). In 386 systems with a 387 numeric coprocessor installed, the numeric coprocessor extension request signal (PEREQ) is connected to this pin on the EBC. NPPEREQ is used by the EBC to help generate the 386 processor extension request output (386PEREQ). |
| EADS# | O | External Address Status. EADS# is used by the 486 to monitor whether any external device has driven its address onto the Host bus. The CPU then will invalidate the corresponding internal cache line in order to maintain coherency. The EBC drives EADS# active for one CLKIN cycle, when the HA bus is stable, for every memory write by an EISA/ISA/DMA master. EADS# is not driven for read cycles. This output is connected to the 486 EADS# input and is not used for 386 systems. |
| 386PEREQ | O | 386 Processor Extension Request. This signal instructs the 386 that the 387 has operands ready to transfer. It is connected directly to the PEREQ input of the 386 and it is not used by 486 systems. |
| IGERR#/ 386ERR# | O | Ignore Numeric Processor Error or 386 Error. In 486 systems, IGERR# goes active when NPCS# and IOWC# are low and SA0 is high (write to port 0F1h) and stays active as long as NPERR# is active. It is connected to the IGNNE# input of the 486. For 386 systems this line reflects the 387 ERROR# status and is also used by the CPU to detect the presence of a 387. If a 387 is installed, this line will be driven low from the leading edge of RSTCPU until the first bus cyde. It is connected to the ERROR# input of the 386. |
| 386BUSY# | O | 386 Busy. This output is only used in 386 systems. 386BUSY# is active whenever the 387 is busy or when a coprocessor error condition has occurred. 386 BUSY# is also it is connected to the 386 BUSY# input. |
| NPINT | O | Numeric Coprocessor Interrupt. This output is connected to IRQ13 of the ISP. It goes active on coprocessor errors (NPERR#) and inactive when reset by an I/O write to port F0h (NPCS#, IOWC# and SA0 all low). |
| ISP/MCC Interface | | |
| DHOLD | I | Delayed Hold Request. This is a request for the Host and EISA bus, generated when the ISP wants to transfer control to an EISA/ISA/DMA master. DHOLD is used to generate HHOLD and will never be active at the same time as refresh request (REFRQ). It is connected to DHOLD from the ISP. |
| REFRQ | I | Refresh Request. It is never active along with DHOLD. If hidden refresh is disabled (Reg C11h <1> = 0 (default) or RegC30h <1> = 0 (default)), this input is used in the same way as DHOLD to request control of the Host and EISA busses during a refresh cycle. However, if Hidden refresh is enabled (Reg C11h<1>=1 AND C30h<1>=1) then the EBC generates RDHLDA at the end of any ongoing CPU cycle. Hidden refresh to the EISA bus will then be performed in parallel with ongoing CPU activity and any new CPU cycle to the EISA bus will be kept waiting until the bus refresh is over. This input is connected to REFRQ from the ISP. |
| SLOWH# | I | Slowdown Hold Request. This is one of several inputs that cause the EBC to generate HHOLD. Since 486 systems are intolerant of frequency changes, this signal provides an alternate method of making the CPU appear to slow down. SLOWH# is generated by the ISP in order to reduce the CPU band width so that it is compatible with older software. SLOWH# will toggle on and off depending on the rate that the ISP chooses to slow down the system. The method also works wkh 386 systems. This input is connected to the SLOWH# output of the |

TABLE II-continued

| Name | Direction | Description |
|---|---|---|
| | | ISP. |
| MCCRDY | I | MCC Ready. This input indicates that the MCC is ready to accept a new cycle. This normally active (high) input goes inactive (low) when a hidden refresh cycle is pending and returns active when the refresh cycle is over. RDHLDA is not allowed to make low to high transitions while MCCRDY is inactive. It is connected to the MCCRDY output of the MCC. |
| RDHLDA | O | Refresh or Delayed Hold Acknowledge. RDHLDA is driven active in response HHLDA from the CPU based on either DHOLD or REFRQ if hidden refresh is disabled. It remains active as long as DHOLD is active. Also, when hidden refresh is enabled, (RegC11h <1> =1 AND RegC30h <1> =1), REFRQ will cause this output to go active as soon as any pending cycle to the EISA bus is completed. In this case, RDHLDA will remain active as long as REFRQ is active. This output is connected to RDHLDA of the ISP and the DBC |
| CPUMISS#/ TMOD# | B | CPU Miss or Test Mode. This pin serves two functions. Normally, CPUMISS# indicates that a host access (HLOCDEV#, WCS# and HLOCM# are inactive) to the EISA bus is pending during a hidden refresh cycle. It is only driven active during RDHLDA. It is also active in response to HHOLD or BREQ and is connected to the CPUMISS# input of the ISP. The second function of this pin is to force the EBC into test mode. The EBC will enter its tristate test mode when this pin is sampled low on the trailing edge of PWRGD or RESETSW# AND IO16#/TSEL is high. CPUMISS#/TMOD# is tristated when PWRGD or RESETSW# is low and a weak internal pull-up keeps it high when no outside source is driving it. |
| ST(3:0) | B | Inter-Chip Status bus. Inter-chip communication bus between the EBC and the ISP to reflect EISA/ISA/DMA control information. Connected to ST(3:0) of the ISP. |
| DRDY | B | Delayed Ready. DRDY Is active during DMA or refresh cycles. It works in conjunction with ST(3:0) and is connected to DRDY of the ISP. |
| EXMASTER# | I | EISA Master. This indicates that an EISA master is in control of the bus. Connected to EXMASTER# from the ISP. |
| EMSTR16# | I | ISA Master. This indicates that an ISA master is in control the bus. Connected to EMSTR16# from the ISP. |
| ISA Bus Interface | | |
| BALE | O | Buffered Address Latch Enable. Externally buffered (such as by a 74F244) to drive BALE of the EISA connectors and the latch enable signal for the SA(19:17) latch. It is driven high during the second half of START# for Host/EISA master cycles and is always high during DMA/ISA/Refresh cycles. |
| CHRDY CHRDYA | B T | EISA Channel Ready. Connected to CHRDY of the EISA connectors. The EBC pulls this line low for ISA master I/O cycle or access to EISA memory with the leading edge of ISACMD (MRDC#, MWTC#, IORC# or IOWC#). |
| GT16M# | I | Greater than 16 MB. The ISP drives this line active for DMA addresses greater than 16 MB. For compatible DMA cycles, the ISA memory commands are inhibited if an EISA memory resource responds when GT16M# is active. It is inactive during refresh and is connected to the GT16M# output from the ISP. |
| M16# M16A# | B T | ISA 16-bit Memory Capability. The EBC pulls both M16# and M16A# low during ISA master cycles based on HLOCM#, EX16# or EX32#. It samples this line during Host/EISA/DMA access to ISA memory to determine the data width and default cycle time. These pins are connected M16# on the EISA connectors. |
| IO16#/TSEL | I | ISA 16-bit I/O. This pin serves two functions. Normally, the EBC samples this line during Host/EISA accesses to ISA I/O in order to determine the data-width and defauft cycle time. It is connected to IO16# of the EISA connectors. The second function of IO16#/TSEL is to force the EBC into test mode. The EBC will enter its tristate test mode when |

TABLE II-continued

| Name | Direction | Description |
|---|---|---|
| | | this pin is sampled high on the trailing edge of PWRGD or RESETSW# AND CPUMISS#/TMOD# is low. |
| NOWS# | I | No Wait State. The EBC samples this for Host/EISA(DMA) cycles to ISA-slaves (memories) on the falling edge of BCLKIN to shorten default cycles if CHRDY is high. It is connected to NOWS# of the EISA connectors. |
| MRDC# | B | Memory Read Command. This is an output of the EBC during Host/EISA/DMA and refresh cycles. This signal is driven active for all these memory reads except during Burst DMA reads or when EX16# or EX32# are sampled active. The EBC also drives MRDC# active during all Compatible DMA reads when GT16M# is inactive. MRDC# is an input during ISA master cycles. It is connected to MRDC# of the EISA connectors through a 74F245 transceiver. |
| MWTC# | B | Memory Write Command. This is an output of the EBC during Host/EISA/DMA and refresh cycles. It drives this signal active for all memory writes except Burst DMA or when EX16# or EX32# are sampled active. The EBC also drives MWTC# active during all Compatible DMA writes when HGT16M# is inactive. MWTC# is an input during ISA master cycles. It is connected to MWTC# of the EISA connectors through a 74F245 transceiver. |
| IORC# | B | I/O Read Command. This signal is an output during Host/EISA/DMA/Refresh master cycles and is driven active during I/O reads. It is an input for ISA master cycles. IORC# is connected to IORC# of the EISA connectors through a 74F245 transceiver. |
| IOWC# | B | I/O Write Command. This signal is an output during Host/EISA/DMA/Refresh master cycles and is driven active during I/O writes. It is an input for ISA master cycles. IOWC# is connected to IOWC# of the EISA connectors through a 74F245 transceiver. |
| GT1M# | I | Greater than 1MB. GT1M# goes active for addresses greater than 1MB. This signal is used to generate SMEMR# and SMEMW#. It is connected to GT1M# from the MCC. |
| SMEMR# | O | System Board Memory Read. Goes active for memory reads to addresses below 1MB (GT1M# is inactive) when MRDC# is active or REFRESH# is active. Buffered to drive SMEMR# of the EISA connectors. |
| SMEMW# | O | System Board Memory Write. Goes active for memory writes to addresses below 1MB (GT1M# is inactive) when MRDC# is active or REFRESH# is active. Buffered to drive SMEMW# of the EISA connectors. |
| REFRESH# | I | Refresh. It indicates that a refresh cycle is in progress. Connected to REFRESH# of the EISA connectors and to the ISP. |
| MASTER16# | I | 16-bit Master. It indicates that a 16-bit EISA/ISA master is in control of the bus. For EISA masters, if it is sampled low at the BCLKIN rising edge where command goes active (after being sampled high one BCLKIN earlier), the EBC assumes a downshifting master and aborts all copying and assembly/ disassembly for 16-bit burst slaves. It is connected to MASTER16# of the EISA connectors. |
| EISA-Bus Interface | | |
| SM/IO# | B | System Memory/IO. The EBC drives these lines |
| SM/IOA# | T | during Host master cycles (based on HM/IO#), ISA master cycles (based on IORC# or IOWC#) and DMA/Refresh (always high). They are connected to M/IO# of the EISA connectors. |
| SW/R# | B | System Write/Read. The EBC drives these lines |
| SW/RA# | T | during Host/DMA master cycles (based on HW/R#), ISA master cycles (based on MWTC# or IOWC#) and Refresh (always low). They are connected to W/R# of the EISA connectors. |
| SLOCK# | B | Bus Lock. The host or bus master asserts LOCK# to |
| SLOCKA# | T | guarantee exclusive memory access during the time LOCK# is asserted. This is an output from the EBC during host master cycles. It is driven active from the BCLKIN falling edge during START# to the BCLKIN falling edge after CMD# going inactive during Host cycles for which HLOCK# is asserted. It is connected to LOCK# of the EISA connectors. |

TABLE II-continued

| Name | Direction | Description |
|---|---|---|
| START#<br>STARTA# | B<br>T | Cycle Start. START is an output for Host/ISA/DMA/ Refresh masters. It is driven active to indicate the beginning of an EISA cycle for all these cases except for Host master cycles when HLOCM#, WCS# or HLOCDEV# has indicated a host-bus device has been decoded on the local bus. It is also an output for assembly/disassembly cycles of an EISA master and is driven active to indicate the beginning of such cycles. For host generated back-to-back I/O cycles (or INTA) to ISA devices (including assembly/disassembly cycles), extra delay is inserted between the trailing edge of the last IORC#/IOWC# and the leading edge of the next START#. The EBC's I/O delay register (C12h<3:0>) determines the number of BCLK delays to be inserted between such cycles. Delays are programmed based on 8-bit and 16-bit accesses. START# and STARTA# are connected to START# of the EISA connectors. |
| CMD# | O | Command. CMD# provides timing control within a cycle. It is driven active from the BCLKIN rising edge when START# is low to the BCLKIN rising edge when MSBURST# is sampled high after EXRDY Is sampled high. CMD# may be wider during DMA cycles and the trailing edge occurs with the BCLKIN failing edge for DMA reads. It is buffered to drive CMD# of the EISA connectors. |
| EXRDY<br>EXRDYA | B<br>T | EISA Bus Ready. It is sampled on the failing edge of BCLKIN when CMD# is active if EX16# or EX32# is also active and used to insert wait-states. Connected to EXRDY of the EISA connectors. |
| MSBURST#<br>MSBURSTA# | B<br>T | Master Burst Capability. This is an output for Host master cycles to indicate to the slave device that the CPU can provide burst cycles. For DMA cycles, this signal is asserted if SLBURST# is active (ie: the EBC will burst if the slave supports it). MSBURST# becomes an input and is sampled by the EBC to terminate EISA CMD# at the end of Burst EISA transfers. Connected to MSBURST# of the EISA Connectors. |
| SLBURST#<br>SLBURSTA# | B<br>T | Slave Burst Capability. SLBURST# is sampled during DMA (burst) master cycles. It is driven active for EISA/DMA cycles if HLOCM# is active (ie: local memory can burst to the EISA bus). Connected to SLBURST# of the EISA connectors. |
| EX32#<br>EX32A# | B<br>T | 32-bit EISA Capability. . The EBC samples EX32# to determine whether a slave supports 32-bit transfers for Host EISA cycles. The EBC drives EX32# low during EISA master cycles based on HLOCM# (ie: local memory supports 32-bit transfers across the EISA bus). Connected to EX32# of the EISA connectors |
| EX16#<br>EX16A# | B<br>T | 16-bit EISA Capability. The EBC samples EX16# to determine whether a slave supports 16-bit transfers for Host EISA cycles. The EBC drives this line low on the BCLKIN failing edge at the end of assembly/disassembly cycles for 16-bit EISA masters. Connected to EX16# of the EISA connectors. |
| Clocks | | |
| CLKIN | I | Clock Input. Master single-phase CPU clock driven from an external clock-generator circuit. For 486 systems, this is the same as the CPU clock. For 386 systems, this is the single-phase version of the CPU CLK2 (half the frequency of the CPU clock). |
| SPEED(1:0)# | I | CPU Speed. These two pins indicate the CPU frequency as follows:<br><br>SPEED(1:0)#    FREQUENCY (Maximum)<br>11                     25 MHz<br>10                     33 MHz<br>01                     40 MHz<br>00                     50 MHz |
| BCLKOUT | O | Bus Clock Output. This BCLK output of the EBC is connected to an external buffer which drives the EISA connectors, ISP and MCC for non-20 MHz systems (20 MHz systems require an external, asynchronous BCLKOUT). The EBC derives this signal by appropriately dividing CLKIN based on the SPEED(1:0)# strapping inputs to generate a frequency of approximately 8 MHz. BCLKOUT can |

TABLE II-continued

| Name | Direction | Description |
|---|---|---|
| | | be stretched at the beginning of Host Master cycles when START# is asserted by enabling the Asynchronous BCLK stretch option in Reg C11h <2>. |
| BCLKIN | I | EISA Bus Clock Input. This input directly samples BCLK from the EISA bus connectors and is used to internally sample and drive all EISA/ISA synchronous signals. |
| BCLK15 | I | Bus Clock delayed by 15ns. Delayed version of BCLKIN from the external delay line. |
| BCLK30 | I | Bus Clock delayed by 30ns. Delayed version of BCLKIN from the external delay line. |
| CLKKB | O | Keyboard Clock X1. Drives the 8042/8742 XTAL1. Unstretched 8/10 MHz signal generated by dividing CLKIN. |
| CLKKB# | O | Keyboard Clock X2. Drives the 8042/8742 XTAL2. Unstretched 8/10 MHz signal generated by dividing CLKIN. |
| Reset Control | | |
| PWRGD | I | Power Good. Connected to PWRGD from the Power Supply. This is used to indicate that the supply voltage has stabilized at an acceptable level and when low, it forces RST#, RSTCPU and RST387 active. |
| RESETSW# | I | Reset Switch. Connected to an external reset switch. This is used to force RST#, RSTCPU and RST387 active. |
| ARMRC# | I | Arm the Reset CPU Logic. This is used by the EBC to arm the logic that generates the RSTCPU signal upon the detection of the next halt cycle. Connected to ARMRC# from the DBC. |
| RST# | O | System Reset. Drives the reset signal, RST#, to the ISP, MCC, DSC and 8042. It is asserted whenever PWRGD or RESETSW# go low and is de-asserted at the same time as RSTCPU. |
| RSTCPU | O | CPU Reset. The EBC drives a reset signal to the host CPU for the following conditions: when RST# is active, when a host master shutdown cycle is decoded, or when ARMRC# was previously asserted and a halt cycle is decoded. RSTCPU is active for a minimum of 64 CLKINs and its trailing edge is synchronized with CLYIN's falling edge. |
| RST387 | O | 387 Reset. This signal goes active with RST# as well as when NPCS#, IOWC# and SA0 are asserted (I/O write to port F1). It is connected to the reset input of the 80387. |
| Data Control | | |
| MDLE(2:0)# | O | Memory Data Latch Enable. These signals are normally inactive. For Host/EISA/DMA master reads, MDLE(2:0)# are active at the same time as CMD#. For EISA/DMA master writes to host devices, MDLE(2:0)# are active from the BCLKIN failing edge during START# until the BCLKIN failing edge after CMD# goes inactive. For ISA master writes, these signals remain active for the duration of MWTC# or from the time IOWC# goes active until the BCLKIN failing edge following IOWC# inactive. In all these cases, MDLE(2:0) are selectively disabled depending upon the master data width, the byte accessed (based on SBE(3:0)#, SA(1:0) or SBHE#), and whether it is a local slave. Connected MDLE(2:0)# of the DBC. |
| MDHDOE1# | O | Memory Data to Host Data Output Enable. This normally inactive signal, goes active as soon as a Host master read cycle from an EISA/ISA slave is detected, and remains active until the end of the cycle (determined by HRDYO# and DRDY). Connected to MDHDOE1# of the DBC. |
| LDMDOE# | O | Local Data to Memory Data Output Enable. This is a normally inactive signal. For EISA/DMA read assembly cycles, it goes active on the BCLK30 rising edge after the last CMD# goes inactive. For EISA/DMA write disassembly cycles, it goes active at the BCLK15 rising edge and remains active until the BCLKJIN failing edge after the last CMD# goes inactive. Connected to LDMDOE# of the DBC. |
| MDSDOE2# MDSDOE1# MDSDOE0# | O | Memory Data to System Data Output Enables. MDSDOE2# controls SD(31:16), MDSDOE1 # controls SD(15:8) and MDSDOE0# controls SD(7:0). Connected to T/R# input of the transceivers between |

TABLE II-continued

| Name | Direction | Description |
|---|---|---|
| | | the SD and MD busses. |
| SDOE(2:0) | O | System Data Output Enables. SDOE2# controls SD(31:16), SDOE1# controls SD(15:8) and SDOE0# controls SD(7:0). Connected to OE# of the transceivers between the SD and MD busses. |
| CPY01# | O | Copy 01. This is enabled for 8-bit ISA slaves if SA0 is 1 for 16-bit masters or if SA(1:0) is 01b for 32-bit masters. It is also enabled for 8-bit non-compatible DMA if SA0 is 1 for 16-bit memory or if SA(1:0) is 01b for 32-bit memory. Connected to OE# of the transceiver between SD(7:0) & SD(15:8). |
| CPY02# | O | Copy 02. This is enabled for 8/16-bit slaves accessed by 32 bit masters if SA(1:0) is 10b. It is also enabled for 32-bit slave access by 16-bit masters or 8-bit non-compatible DMA when SA(1:0) is 10b. Connected to OE# of the transceiver between SD(7:0) & SD(23:16). |
| CPY03# | O | Copy 03. This is enabled for 8-bit ISA slave access by 32-bit masters and for 32-bit EISA slave access by 8-bit non-compatible DMA when SA(1:0) is 11b. Connected to OE# of the transceiver between SD(7:0) & SD(31:24). |
| CPY13# | O | Copy 13. This is enabled for 16-bit slaves accessed by 32 bit masters when SA1,SBHE# is 10b. It is also enabled for 32-bit slave accesses from 16-bit masters when SA1,SBHE# is 10b. Connected to OE# of the transceiver between SD(15:8) & SD(31:16). |
| CPYUP | O | Copy Up. This normally high signal goes low during reads when the master (I/O for DMA) width is less than the slave width and during writes when the master (I/O for DMA) width is greater than the slave width. Connected to the direction control of the SD transceivers. |
| Address Control | | |
| ISAMSTR# | O | ISA Master. This is active during EMSTR16# or REFRESH. Connected to OE# of the buffer driving LA(16:2) from SA(16:2). |
| ISAMSTR | O | ISA Master. Connected to OE# of the latch driving SA(19:2) from LA(19:2). This is the active high version of ISAMSTR#. ISAMSTR and ISAMSTR# are also used to control the T/R# of the transceiver that drives MRDC#, MWTC#, IORC#, IOWC#, SA(1:0) and SBHE#. |
| HALAOE# | O | HA bus to LA bus Output Enable. This normally active signal is inactive when REFRESH# is active. It is also inactive when DHOLD is inactive and HHLDA is active. Connected to OE# of the F640/F245 transceivers between LA(31:2) and HA(15:2). |
| LAHARD | O | LA bus to HA bus Read. This signal sets the direction between the LA bus and the HA bus. Connected to DIR of the F640/F245 transceivers between HA(31:21,19:16) and LA(31:24)#, LA(23:21,19:16). |
| LASALE# | O | LA Synchronous Address Latch Enable This signal is the active low version of BALE. It is connected to the corresponding pin of the DBC and LE# of the latch driving SA(16:2) from LA(16:2). |
| AENLE# | O | AEN Latch Enable. For Host /EISA masters, this normally active signal goes high for accesses to ISA I/O at the BCLKIN rising edge when CMD# goes active. It is connected to AENLE# of the DBC. |
| HBE(3:0) | B | Host Byte Enables. The EBC drives these signals during EISA/ISA/DMA master cycles (from SBE(3:0)#) and ISA master cycles from SA(1:0) and SBHE#). They are inputs during Host master cycles and are connected to Host CPU BE(3:0)#. |
| SBE(3:0)# | B | System Byte Enables. The EBC drives these signals |
| SBE(3:0)A# | T | during Host master cycles (based on HBE(3:0)# and HKEN#), during ISA master cycles (from SA(1:0) and SBHE#) and from an internal counter during assembly/disassembly cycles. Connected to BE(3:0)# of the EISA connectors. |
| SA(1:0) | B | System Address 0 and 1. The EBC drives these lines for Host master cycles (based on HBE(3:0)# and HKEN#), for EISA/DMA/Refresh master cycles (based on SBE(3:0)# and from an internal counter for assembly/disassembly cycles). They are connected to SA(1:0) of the EISA connectors through a 74F245 transceiver. |
| SBHE# | B | System Byte High Enable. The EBC drives this line |

TABLE II-continued

| Name | Direction | Description |
| --- | --- | --- |
| | | for Host master cycles (based on HBE(3:0)# and KEN#), for EISA/DMA/Refresh master cycles (based on SBE(3:0)# and from an internal counter during assembly/disassembly instructions). Connected to SBHE# of the EISA connectors through a 74F245 transceiver. |
| HA20 | B | Host Address 20. The Host master drives this signal into the EBC except during EISA/ISA master cycles when it is based on LA20. HA20 is connected to Host CPU A20. |
| A20M# | I | Address A20 Mask. For 386 systems, this is an input from the MCC's A20M# pin and is used to mask Host address A20. For 486 systems, the CPU takes care of the masking (it receives A20M# directly from the MCC) so this pin must be tied high. |
| LA20 LA20A | B T | LA Bus Address A20. The EBC drives this line for Host master and DMA cycles (from HA20 & A20M#). It is an input for EISA/ISA master cycles. Connected to LA20 of the EISA connectors. |
| Register Access | | |
| NPCS# | I | Numeric Coprocessor Chip Select. Chip select decode for numeric coprocessor access. Active when SA(15:3) decodes to 111X0XXXb and AEN# is inactive. The EBC internally qualifies this during I/O cycles in its coprocessor/387RESET logic. Connected to NPCS# from the DSC. |
| EBCCS# | I | EBC Chip Select. Active for EBC internal register access. This signal goes active when SA(15:2) decodes to C10:C13h and AEN# is inactive. It is connected to EBCCS# from the DBC. |
| XD(3:0) | B | XD Bus Low Nibble. These four lifts provide data to/from the EBC during its internal register access. They are connected to XD(3:0) of the ISP. |

The ISP 221 is an integrated system peripheral chip which integrates two timers, EISA NMI/Time-out logic, two modified 8259-type interrupt controllers, the EISA DMA/Refresh controller, and the EISA system arbiter. It also integrates the logic required to create the local peripheral bus (XD-bus 219) by providing internal buffering between SD(7:0) on EISA bus 202 and XD(7:0). Also, data read from internal ISP 221 registers is presented directly on the SD bus. Other features of the ISP 221 are not important to an understanding of the invention. Table III describes the signal connections to the ISP 221.

TABLE III

| Bus Interface | | |
| --- | --- | --- |
| HA(31:16) | O | Host Address Bus. Driven during DMA with memory address. Connected to Host CPU A(31:16). |
| IA(15:8) | B | Intermediate Address Bus. Driven during DMA/Refresh with memory address. Connected to LA(15:8) of the EISA connectors thru a transceiver. |
| LA(7:2) | B | EISA Latched Address Bus. Driven during DMA/Refresh with memory address. Connected to LA(7:2) of the EISA connectors. |
| LASALE# | I | LA Bus to SA Bus Latch Enable. Latch enable control for LA-SA buffer. Connected to LASALE# from the EBC. |
| IALAOE | O | IA Bus to LA Bus Output Enable. Direction control for IA-LA transceiver. It is connected to an external transceiver. |
| SBE(3:0)# | B | System Byte Enables. These are sampled/used in the same way as IA(15:8). Connected to SBE(3:0)# of the EISA connectors. |
| HW/R# | O | Host Write/Read. Driven during DMA indicating data direction to memory. Connected to Host CPU W/R#. |
| START# | I | START. Used to Start an EISA cycle. Connected to START# of the EISA connectors. |
| IORC# | I | I/O Read Command. Used to read ISP internal registers onto the SD bus. Connected to IORC# of the EISA connectors. |
| IOWC# | I | I/O Write Command. Used to write to the ISP internal registers. Connected to IOWC# of the EISA connectors. |
| SD(7:0) | B | System Data Bus. Data lines used for programming the ISP and for buffering XD(7:0). Connected to XD(7:0) of DBC. |
| XD(7:0) | B | Peripheral Data Bus. Data lines that connect to SD(7:0) thru the integrated transceiver. These lines are driven when XDEN# is active and XDRD# |

TABLE III-continued

| | | |
|---|---|---|
| | | inactive. Connected to XD(7:0) |
| XDEN# | I | XD Bus Enable. Enables the XD output buffer. Connected to XDEN# from the DSC |
| XDRD# | I | XD Bus Read. Controls the direction of data on the XD bus. Connected to XDRD# from the DSC. |
| ST(3:0) | B | Inter-Chip Status Bus. Connected to ST(3:0) of the EBC. During DMA/Refresh, the ISP drives these lines.<br>a) ST(3:2) encodes the DMA requester width as follows:<br>    ST(3:2)  REQUESTER WIDTH<br>    00         8-bit<br>    01         16-bit<br>    10         32-bit<br>    11         Idle<br>b) ST(1:0) encodes the DMA cycle timing as follows:<br>    ST(1:0)  CYCLE TIMING<br>    00         Compatible<br>    01         Type-A<br>    10         Type-B<br>    11         Burst (only for 16/32 bit) |
| DRDY | B | DMA Ready. The EBC drives this line during DMA or Refresh. Connected to DRDY of the EBC. |
| BCLK | I | EISA Bus Clock. Connected to BCLK of the EISA connectors. |
| Timer | | |
| OSC | I | Timer Oscillator. This is the main clock used by the internal 8254 timers. Connected to 14.31818 MHz oscillator. |
| SPKR | O | Speaker Tone. Used to drive the system-board speaker. This signal is derived from the Timer-0 Counter-2 and a Port-B bit. |
| SLOWH# | O | Slowdown Hold Request. Used to make the CPU appear to "slow down" when necessary for compatibility reasons. Driven from the output of Timer-1 Counter-2. |
| NMI/Timeout logic | | |
| PARITY# | I | Parity Error Strobe. The failing edge of this signal Indicates a host DRAM parity failure. Connected to PARITY# from the DSC. |
| IOCHK# | I | I/O Channel Check. An EISA/ISA device signals a fatal error by driving this line low. Connected to IOCHK# of the EISA connectors. |
| NMI | O | Non-Maskable-Interrupt. NMI is generated in response to PARITY#, IOCHK#, slave timeout, failsafe timer timeout, EISA master timeout or I/O writes to port 462h. Connected to the host CPU's NMI pin. |
| RST# | I | Motherboard Reset. It is driven active when PWRGD or RESETSW# is low. Connected to RST# from the EBC. |
| CMD# | I | EISA Bus Command. This is used to generate a slave timeout. It is connected to CMD# of the EISA connectors. |
| RSTDRV | O | Reset Drive. This is driven active during RST# or due to a software-reset or slave/EISA-master timeout. Connected to RSTDRV of the EISA connectors. |
| Interrupt | | |
| IRQ(15:9) | I | Interrupt Request Bus. Connected to IRQ(15:14) of the EISA connectors, NPINT from the EBC and IRQ(12:9) of the EISA connectors. |
| IRQ8#/TSEL | I | Interrupt Request 8 or Test Mode Select. This pin normally functions as the IRQ8 input and is connected to IRQ# from the RTC. The second function of IRQ8#/TSEL is to force the ISP into test mode. The ISP will enter its tristate test mode when this pin is sampled high on the trailing edge of RST# AND GT16M#/TMOD# is sampled low. |
| IRQ(7:3),1 | I | Interrupt Request Bus. Connected to IRQ(7:3) of EISA connectors and IRQ1 from the Keyboard Controller. |
| INT | I | Interrupt. Connected to Host-CPU INT. |
| DMA/Refresh | | |
| DRQ(7:5)<br>DRQ(3:0) | I | DMA Request Bus. Connected to DRQ(7:5),(3:0) of the EISA connectors. |
| DACK(7:5)<br>DACK(3:0) | O | DMA Acknowledge Bus. Connected to DACK(7:5),(3:0) of the EISA connectors. |
| REFRESH# | B | Refresh. Refresh is driven low for non ISA master refresh cycles to the EISA bus. It is used as an asynchronous input for ISA master generated refresh and for ST(3:0) and DRDY direction control. Connected to REFRESH# of the EISA connectors. |

TABLE III-continued

| | | |
|---|---|---|
| EOP | B | End-of-Process. As an output, it indicates that the DMA channel's word count has reached terminal count. As an input, it indicates that a DMA slave wishes to stop the a DMA transfer. Connected to TC of the EISA connectors. |
| AEN# | O | Address Enable. Indicates that an address is being driven by the DMA controller and is used for the I/O decode and slot-specific generation of AENx. Connected to the corresponding pin of the DBC. |
| I/O Decodes | | |
| RTCAS | O | Real Time Clock AS. Active for 2 BCLK's from the leading edge of CMD# if address 1 1 1 X XX0b is decoded from LA(15:2), SBE(3:0)# and AEN#. It remains active from RST# until the first CMD#. Connected to AS of the RTC. |
| GT16M#/TMOD# | B | Greater Than 16M or Test Mode. This pin has two functions. Normally, it is driven active during DMA cycles when an address greater than 16M is presented on HA(31:24). The second function of this pin is to allow the ISP to enter its test mode. If sampled low at the trailing edge of reset (RST#), along with IRQ8#/TSEL being high, then the ISP enters its Tristate test mode. This signal is tristated during RST# and a weak internal pull-up keeps it high when no outside tester or source is driving it. |
| System Arbiter | | |
| MREQ(6:1)# | I | Slot Specific EISA Master Bus Request. Each slot provides an EISA bus master to have its own bus request line. Connected to slot-specific MREQx# of the EISA connectors. |
| MACK(6:1)# | O | Slot Specific EISA Master Bus Request Acknowledge. Connected to slot-specific MACKx# of the EISA connectors. |
| CPUMISS# | I | CPU Miss. This signal tells the arbiter that the host CPU is waiting for the bus. This signal is asynchronous wkh BCLK. Connected to CPUMISS# from the EBC. |
| DHOLD | O | DMA Hold. This is a request for the Host and EISA bus, generated when the arbiter wants to transfer control to an EISA/ISA/DMA master. Connected to DHOLD of the EBC. |
| REFRQ | O | Refresh Request. This is a request for the EISA bus, generated when the arbiter wants to transfer control to the Refresh controller. Connected to REFRQ of the EBC & MCC. |
| RDHLDA | I | Refresh/DMA Hold Acknowledge. This is the acknowledgement to DHOLD or REFRQ, indicating that the requested bus/busses is/are free. RDHLDA's leading edge is asynchronous and the trailing edge is caused combinatorially from DHOLD or REFRQ. Connected to RDHLDA from the EBC. |
| EXMASTER# | O | EISA Master. This indicates that an EISA master is in control of the Host/EISA bus. Connected to EXMASTER# of the EBC. |
| EMSTR16# | O | ISA Master. This indicates that an ISA master is in control of the Host/EISA bus. Connected to EMSTR16# of the EBC and the MCC. |

The DBC 216 performs various steering logic and control/decode functions. It integrates data buffers and provides data buffer control, XD 219 bus control, AEN generation, parity generation/checking logic, decode logic for an external keyboard controller, real time clock control, system configuration RAM control as well as EISA ID register support and general purpose chip selects.

The DBC 216 performs data bus conversion when a system master accesses 8, 16, or 32-bit devices through 16-bit or 32-bit instructions. The DBC 216 also handles DMA and EISA bus master cycles that transfer data between local DRAM or cache memory and locations on the EISA bus 202. The DBC receives data buffer control signals from the EBC 220 and the ISP 221. It generates XD bus control signals XDEN# and XDRD#.

The DBC 216 also generates chip select signals for the keyboard controller, real time clock chip, configuration non-volatile-memory (NVM) and the configuration registers in EBC 220. It also generates control logic based on address decoding for numeric coprocessor error clearing, the EISA ID register, the real time clock chip, configuration NVM and Fast CPU warm resets. Other features of the DBC 216 are not important for an understanding of the invention and will not be described here. The external pin connections for DBC 216 are set forth in Table IV.

TABLE IV

| | | |
|---|---|---|
| Data Bus Interface | | |
| HD(31:0) | B | Host Data Bus. 32-bit local host bus connected to Host CPU D(31:0) |

TABLE IV-continued

| | | |
|---|---|---|
| MD(31:0) | B | Memory Data Bus. 32-bit local DRAM data bus connected to DRAMs. |
| XD(7:0) | B | Motherboard Peripheral Data Bus. This 8-bit data bus supports motherboard I/O functions. It is connected to the ISP, MCC, 8042, RTC, Configuration RAM and BIOS ROM |
| Data Buffer Control | | |
| MDHDCLK | I | MD to HD Control Clock. The rising edge of this signal is used to clock data from the memory data bus (MD(31:0)) and the memory parity bus (MP(3:0)) into DSC's internal flip-flops. It is connected to MDHDCLK from the MCC. |
| MDLE(2:0)# | I | Memory Data Bus Latch Enables. These latch enables allow the DBC to sample data on the MD bus on a byte-by-byto basis. They are used for all EISA/ISA/DMA master writes and read assembly cycles. MDLE0# controls byte-lane 0, MDLE1# controls byte-lane 1 and MDLE2# controls byte-lane 3. Byte-lane 2 is enabled when MDLE2# is active AND SA(1:0) does NOT equal 11b. These signals are connected from the EBC's MDLE(2:0)# output pins. |
| MDHDOE1# MDHDOE0# | I | Memory Data to Host Data Output Enables. Both of these signals are normally inactive. When MDHDOE0# is active, data from the MD bus flip-flops are driven onto the HD bus. When MDHDOE1# is active, data from the MD bus latches are driven onto the HD bus. MDHDOE0# is connected to MDHDOE# from the MCC while MDHDOE1# is connected to MDHDOE# from the EBC. |
| LDMDOE# | I | Latched Data to Memory Data Output Enable. When this signal goes active, data from the MD-bus latches are driven back onto the MD bus. LDMDOE# is connected to EBC. |
| HDMDLE# | I | Host Data to Memory Data Latch Enable. This signal enables data from the HD bus to the DBC's internal latches. It is connected to HDMDLE# from the MCC. |
| HDMDOE# | I | Host Data to Memory Data Output Enable. This signal enables data from the HD bus latches to the MD bus (MD(31:0)) and also enables the internally generated parity information onto the MP bus (MP(3:0)). It is connected to HDMDOE# from the MCC. |
| ROMCS# | I | ROM Chip Select. This input is used to qualify XDEN# and XDRD. It is connected to ROMCS0# from the MCC. |
| MRDC# | I | ISA Memory Read Command. This input is used to help decode and generate the XDRD# signal when ROMCS# is active. It is connected to MRDC# of the EISA bus. |
| RDHLDA | I | Refresh/DMA Hold Acknowledge. This input is used to qualify XDEN# and XDRD# during INTA cycles and manufacturer specific I/O decodes. It is connected to RDHLDA from the EBC. |
| ST2 | I | Inter-Chip Status bit-2. Connected to ST2 from the EBC. |
| XDEN# | O | X-Bus Data Enable. This control signal enables the transceiver between XD(7:0) and SD(7:0). |
| XDRD# | O | X-Bus Data Read. This control signal sets the direction of the transceiver from XD(7:0) to SD(7:0). |
| Parity and Control | | |
| MP(3:0) | B | Memory Parity Bus. 4-bit bus (one bit per byte) connected to DRAM parity bits. |
| PAREN# | I | Parity Enable. PAREN# provides the timing for generating PARITY# in the event of a parity failure. It is connected to PAREN# of the MCC. |
| PARITY# | O | Parity Error. This signal goes active if during a parity failure if parity is enabled (PAREN#). It is connected to PARITY# of the ISP. |
| I/O Address and Control | | |
| LA(15:2) | I | EISA/ISA Latched Address Bus. This bus is used for AEN(8:1) generation and other I/O decodes. Connected to LA(15:2) of the EISA connectors. |
| SM/IO# | I | EISA System Memory/IO. Used for AEN(8:1) decoding only. It Is connected to SM/IO# of the EISA connectors. |
| SA(1:0) | I | EISA System Address Bus bits (1:0). These two low order address bits are used for I/O decodes and also to enable the proper byte-lane latches on the MD bus. Connected to SA(1:0) of the EISA connectors. |
| AENLE# | I | AEN Latch Enable. The low to high transition of this input latches the current state of AEN(8:1) and all I/O |

TABLE IV-continued

| | | |
|---|---|---|
| | | chip-select outputs. It is connected to AENLE# from the EBC. |
| LASALE# | I | LA Bus Latch Enable. The low to high transition of this input signal latches the current state of I/O decodes from the LA bus. It is connected to LASALE# from the EBC. |
| IORC# | I | EISA I/O Read Command. This input is used to generate RTCRD# and XDRD# as well as to enable internal register data onto the XD bus. It is connected to IORC# of the EISA connectors. |
| IOWC# | I | EISA I/O Write Command. This input is used to generate KBDWR#, RSTNERR#, NPRST# and to write to the internal configuration registers. It is connected to IOWC# of the EISA connectors. |
| AEN# | I | Address Enable. AEN indicates that the current address is being driven by the DMA controller. It is used to qualify AEN(8:1) as well as other I/O decodes. |
| RST# | I | Motherboard Reset. This reset input is active when powergood (PWRGD) is low or when the reset switch is active (RESETSW#). It is connected to RST# from EBC and is used to reset the motherboard peripherals. |
| Fast CPU Reset Control | | |
| ARMRC# | O | Arm CPU Reset. The DBC snoops accesses to I/O port 0110 X1X0b (64h) and generates ARMRC# if an F0h is written to this location. Warm reset cycle times are greatly reduced through this emulation. This signal is connected to the ARMRC# input of the EBC where it is processed to create the CPURST signal. |
| I/O decode | | |
| AEN(8:1) | O | Slot Specific AEN Bus. Each EISA slot receives a unique AEN signal to indicate whether it can respond to addresses and I/O commands on the EISA bus. Each signal is connected to its corresponding slot-specific AENx on the EISA connectors. |
| CRAMOE#/ CRAMCS# | O | CMOS RAM Control. This signal is active when 08XXh is decoded from LA(15:8) and drives the output enable of the DS1488 and the chip enable (CE#) of the battery-backed CMOS SRAM. |
| KBDCS#/ TMOD# | B | Keyboard Chip Select or Test Mode. This pin has two functions. Normally, it serves as the keyboard chip select output which goes active when address 0110 XXX0b is decoded from LA bus and SA bus addresses. It is connected to the CS# input of the keyboard controller. The second function of this pin is to allow the DBC to enter it's test mode. If this signal is low on the trailing edge of RST# and PORT7/TSEL is high, then the DBC enters its Tristate Test mode. A weak internal pull-up on this signal keeps it high during RST# if no outside tester/source is driving it. |
| KBDWR# | O | Keyboard Write. KBDWR# goes active with IOWC# except when ARMRC# goes active. It is connected WR# of 8042/8742. |
| NPCS# | O | Numeric Coprocessor Chip Select. This output is used by the EBC in its coprocessor qualification logic. It is active for LA(15:3) decodes in the range of 111X 0XXXb when AEN# is inactive. It is connected to NPCS# of the EBC. |
| RTCDS# | O | Real Time Clock Select. This output is active when IORC# or IOWC# is active and 0111 XXX1b is decoded from LA and SA addresses. It is connected to the DS input of the real time clock. |
| RTCWR# | O | Real Time Clock Read/Write. This signal is active when IOWC# is active and 0111 XXX1b is decoded from LA and SA addresses. It is connected to R/W# of the RTC. |
| EBCCS# | O | EBC Chip Select. This output goes active when the I/O address range (C10:C1F)h is decoded from LA(15:2) and AEN#. The EBC uses this signal as a chip select to qualify access to its internal configuration registers. It is connected to EBCCS# of the EBC. |
| IOCS0# | O | General purpose ISA I/O chip select 0. This pin can decode an I/O block of 1-128 bytes located at any multiple of the block size. The address comparison for IOCS0# is done with internal registers at I/O address (C03:C02)h. Additionally, when configuration register C06h<6:0> is set, the corresponding address bits of SA(6:0) are masked in the decoding. |

TABLE IV-continued

| | | |
|---|---|---|
| | | Configuration register C06h<7> determines whether XDEN# is active for this chip select (the default state is off for XDEN#). This output defaults to a one byte decode at I/O address 0. |
| IOCS1# | O | General purpose ISA I/O chip select 1. This pin can decode an I/O block of 1-128 bytes located at any multiple of the block size. The address comparison for IOCS0# is done with internal registers at I/O address (C05:C04)h. Additionally, when configuration register C07h<6:0> is set, the corresponding address bits of SA(6:0) are masked in the decoding. Configuration register C07h<7> determines whether XDEN# is active for this chip select (the default state is off for XDEN#). This output defaults to a 128 byte decode at I/O address 0. |
| Port Control | | |
| PORT0/TSEL | B | Port 0 or Test Mode Select. This pin functions as either a parallel I/O port or a test mode select input. When configuration register C00h <6> = 0 (default, DS1488 support mode), this becomes a general purpose I/O port written and read at address C00h <0>. This bit is an input if C00h <4> = 0 (default) and an output if C00h <4> = 1. When C00h <6> = 1 (battery-backed SRAM mode), this bit is always an output and is connected to A11 of the SRAM. PORT0/TSEL must be high on the trailing edge of RST# (and KBDCS#/TMOD# must be low) for the chip to enter its tristate test mode. This test mode forces all outputs and bi-directional pins into a tristate configuration. |
| AS1#/PORT1 | O | Address Strobe 1 or Port1. In DS1488 support mode, AS1# is connected to the corresponding AS1# pin of the DS1488 real time clock. In battery-backed SRAM mode, PORT1 is connected to A9 of the battery-backed CMOS SRAM. |
| AS0#/PORT2 | O | Address Strobe 0 or Port2. In DS1488 support mode, AS0# is connected to the corresponding AS0# pin of the DS1488 Real time clock. In battery-backed SRAM mode, PORT2 is connected to A10 of the battery-backed CMOS SRAM. |
| CRAMWE#/ PORT3 | O | CMOS RAM Write Enable or PORT3. In DS1488 support mode, CRAMWE# is connected to the WE# pin of the DS1488 real time clock. In battery-backed SRAM mode, PORT3 is connected to A11 of battery-backed CMOS SRAM. |

The Chipset in the system of FIG. 2 operates in response to a plurality of command and configuration registers which may be written to or read from by the CPU 212. These registers are directly addressable in the I/O address space. The actual method and circuitry for writing values to these registers is conventional and need not be described here. Most values are written once during the system power-on sequence in response to instructions in system BIOS ROM 222 (FIG. 2). The fields of the registers also are mostly not important to an understanding of the invention and may be determined from the above-mentioned OPTi databook. However, the register fields described below in Table V may be useful for an understanding of the invention.

TABLE V

| | |
|---|---|
| MCC Hidden Refresh Enable Register | When disabled, the MCC's internal CPU/refresh arbiter for DRAM access is turned off. In this case the MCC expects the CPU to be held via HHOLD/HHLDA when a refresh occurs. Hence, the EBC hidden refresh function must be turned off when the MCC hidden refresh function is turned off. Default = disabled. |
| EBC Hidden Refresh Register | When disabled, the REFRQ input causes the CPU to be held by HHOLD/HHLDA rather than performing a hidden refresh. Default = disabled. |
| DHOLD Delay Register | 5-bit register for delaying DHOLD. The DHOLD signal is delayed by the number of BCLK cycles specified when the bus is to be |

TABLE V-continued

| |
|---|
| granted to an EISA master or EISA DMA device. |

Figure 3:
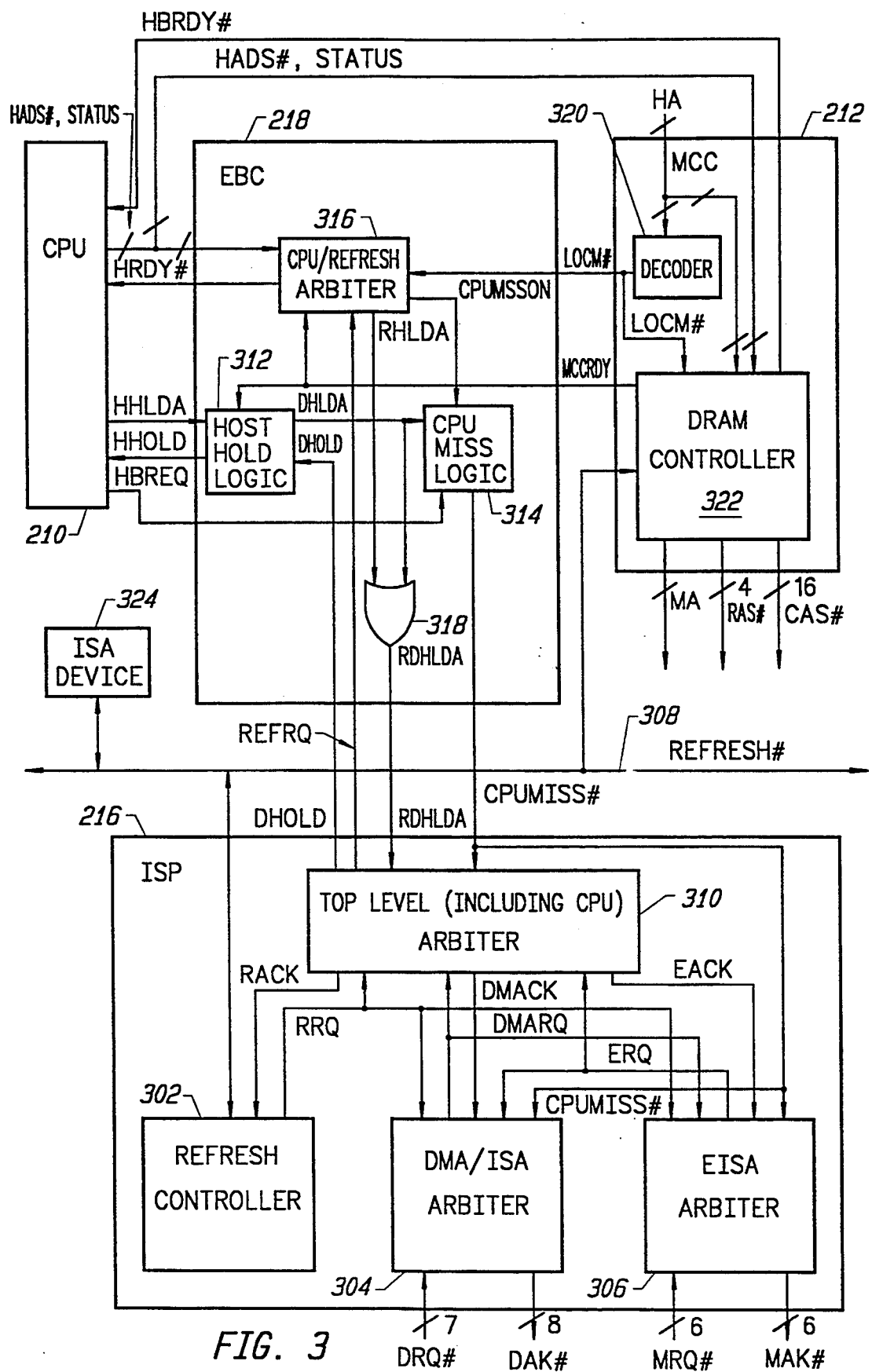
FIG. 3 is an illustrative block diagram of portions of the system of FIG. 2 implementing aspects of an embodiment of the invention.

FIG. 3 is a block diagram of relevant portions of the system of FIG. 2, including portions in the EBC 218, MCC 212 and ISP 216 relevant to the arbitration function. In particular, the ISP 216 includes a refresh controller 302, a DMA/ISA arbiter 304, an EISA arbiter 306, and a top level arbiter 310. Note that the top level arbiter 310 incorporates all the functions of EISA priority arbitration included in boxes 102 and 110 (FIG. 1), while the EISA arbiter 306 incorporates the functions in box 112. The refresh controller 302 is a conventional EISA refresh controller in the sense that it includes a refresh timer whose terminal count output clocks a pending refresh counter. The pending refresh counter can store up to four pending refreshes, and activates a refresh request line RRQ output when the pending refresh counter is non-zero. Upon receipt of an acknowledgment over an RACK input, the refresh controller decrements its pending refresh counter and pulls the system bus REFRESH# line 308 active for the required duration of an EISA bus refresh cycle. Additional details of the refresh controller 302 are not important for an understanding of the invention. The RRQ output of refresh controller 302 is connected to an RRQ input of a top level arbiter 310 in the ISP 216, as well as to the DMA/ISA arbiter 304 and the EISA arbiter 306. The top level arbiter 310 also outputs the RACK signal provided to the refresh controller 302 when a refresh request is granted.

The DMA/ISA arbiter 304 generates a DMARQ signal which is provided to the top level arbiter 310 and to the EISA arbiter 306, and receives a DMACK signal from the top level arbiter 310. The DMA/ISA arbiter 304 is also connected to receive the seven system bus DRQ# signals and to provide seven respective DAK# signals to respective ISA devices. The EISA arbiter 306 generates an ERQ signal which is provided to the top level arbiter 310 and to the DMA/ISA arbiter 304, and receives an EACK signal from the top level arbiter 310. The EISA arbiter 306 is also connected to receive the six MRQ# signals from EISA devices on the system bus, and is also connected to generate six respective MAK# signals to the respective EISA devices.

The top level arbiter 310 generates both a DHOLD signal and REFRQ to EBC 218, and also receives an RDHLDA signal and a CPUMISS# signal from the EBC 218. The CPUMISS# signal is also provided to the EISA arbiter 306 and to the DMA/ISA arbiter 304.

Inside the EBC 218, the DHOLD signal is provided to host hold logic 312, which also receives an MCCRDY signal from MCC 212. Host hold logic 312 generates the HHOLD signal to the CPU 210 and receives back the HHLDA signal. Host hold logic 312 also generates a DHLDA signal which is provided to CPU miss logic 314 in the EBC 218.

The REFRQ signal from ISP 216 is provided to a CPU/refresh arbiter 316 in the EBC 218, which also receives the MCCRDY signal from MCC 212 and an LOCM# signal from MCC 212. The CPU/refresh arbiter generates the HRDY# signal to CPU 210, and also receives the HADS# and status lines from CPU 210. CPU/refresh arbiter 316 further generates a CPUMSSON signal provided to CPU miss logic 314.

CPU miss logic 314 receives, in addition to DHLDA and CPUMSSON, the HBREQ signal from CPU 210. It also generates the CPUMISS# signal provided to ISP 216. The CPU/refresh arbiter 316 also generates an RHLDA signal which is connected to one input of a two-input OR gate 318, the other input of which is connected to receive DHLDA.

MCC 212 contains, among other things, an address decoder 320 and a DRAM controller 322. The decoder 320 receives the host bus address lines HA and generates the LOCM# signal to the EBC 218. The DRAM controller 322 receives the host bus HADS# and status signals, the HA address lines, the LOCM# signal from decoder 320, and the signal on the system bus REFRESH# line 308. It generates MCCRDY for the EBC 218, HBRDY# for the CPU 210, the MA memory address lines for the DRAM as well as four RAS# signals and sixteen CAS# signals for the DRAM.

Also shown in FIG. 3 is an ISA device 324 which is coupled bi-directionally with the system bus REFRESH# line 308. Not only do ISA devices such as 324 respond to a system bus REFRESH# assertion, but according to the ISA specification, they can at times also assert REFRESH# while they have control of the system bus.

In operation, when the EISA arbiter 306 receives one or more MRQ# signals asserted, the EISA arbiter 306 in turn asserts ERQ to the top level arbiter 310. As shown in boxes 102 and 110, the top level arbiter 310 arbitrates among the various present requestors for the system bus according to the EISA- specified priority sequence. If ERQ wins the arbitration, the top level arbiter 310 asserts DHOLD to the EBC 218. In the EBC 218, host hold logic 312 synchronizes the DHOLD signal with the host bus CLK signal to assert HHOLD to the CPU 210. When the CPU 210 asserts HHLDA in response, host hold logic 312 correspondingly asserts DHLDA. As will be seen, however, DHLDA is delayed if necessary until MCCRDY is active. DHLDA then passes through OR gate 318 and is asserted to top level arbiter 310 as RDHLDA. Top level arbiter 310 then asserts EACK to the EISA arbiter 306 which finally asserts MAK# to the EISA device which won the EISA-specified arbitration among requesting EISA devices. When the winning EISA device finishes with the bus, it de-asserts its MRQ# signal to the EISA arbiter 306, which in turn de-asserts ERQ to the top level arbiter 310. Top level arbiter 310 can then perform the next arbitration for the bus as specified by the EISA priority arbitration sequence.

If the CPU is requesting the system bus, and is scheduled to win next according to the EISA priority scheme, or if no other device is presently requesting the system bus, top level arbiter 310 will de-assert DHOLD to the host hold logic 312, which will in turn de-assert HHOLD to the CPU 210. The CPU will in turn de-assert HHLDA back to the host hold logic 312, which will in turn de-assert DHLDA, which then passes through OR gate 318 to de-assert RDHLDA back to the top level arbiter 310. In order to implement the EISA-specified top level rotating priority scheme, the top level arbiter 310 includes a "last grant" register containing the identity of the last top level requestor granted control of the bus (EISA, DMA/ISA, refresh or CPU). If the CPU was granted the bus by default, the last grant register should be left unchanged.

DMA/ISA arbiter 304, similarly, activates its DMARQ output whenever one of the ISA devices is requesting control of the system bus. As with the EISA requestors, if a top level arbiter 310 determines that the ISA device is to receive control of the bus next, the top level arbiter 310 asserts DHOLD to the EBC 218 and, when RDHLDA is returned back from the EBC 218, asserts DMACK back to the DMA/ISA arbiter 304. The DMA/ISA arbiter 304 then asserts DAK# for the ISA device which won the ISA-specified arbitration within DMA/ISA arbiter 304 to grant the bus to that device. The operation of the circuitry of FIG. 3 when the ISA device finishes with the bus is similar to that described above when an EISA device finishes with the bus.

After the CPU 210 acknowledges a hold request via HHLDA, if it is a 486 compatible CPU, it will also assert HBREQ when it once again requires control of the host bus (and/or the local memory and/or the system bus). If DHLDA is asserted when HBREQ is received, the CPU miss logic 314 will then generate CPU-MISS# to arbitrate on behalf of the CPU for control of the system. 386-compatible CPUs do not have an HBREQ output, so the CPUMISS# output is driven active independently of HBREQ.

When either CPUMISS#, DMARQ or RRQ are asserted while an EISA device controls the system bus, EISA arbiter 306 interprets that as a preemption request pursuant to the EISA specification, and accordingly de-asserts the MAK# signal currently asserted. The EISA device then must release the bus within a prescribed period of time or be forced off the bus. When it releases the bus, it does so by de-asserting its MRQ# signal to the EISA arbiter 306, which de-asserts ERQ and permits the top level arbiter 310 to grant the system bus to the next requestor winning the arbitration. The operation of the DMA/ISA arbiter 304 in a preemption situation is similar. The preemption procedure is described in more detail in the EISA specification referred to above.

When refresh controller 302 determines that a refresh should be performed on the system bus, it asserts RRQ to the top level arbiter 310. If the top level arbiter 310 determines that the refresh controller should be granted the bus next, instead of asserting DHOLD to the EBC 218, top level arbiter 310 asserts REFRQ to the EBC 218. HHOLD is not asserted to the CPU 210. Instead, the CPU/refresh arbiter 316 waits for the completion of any CPU access over the system bus which may then be taking place, before asserting RHLDA (and therefore RDHLDA) back to the top level arbiter 310. The CPU/refresh arbiter 316 also waits for the completion of any prior local DRAM refresh which may be pending in the MCC, as indicated by MCCRDY being low, before returning RHLDA. The CPU/refresh arbiter 316 then delays the start of any subsequent CPU cycle on the system bus until the system bus refresh is complete. If the CPU 210 is not performing an access over the system bus at the time REFRQ reaches the CPU/refresh arbiter 316, and a local DRAM refresh is not pending in the MCC (as indicated by MCCRDY) the CPU/refresh arbiter 316 does not delay RHLDA at all.

While a refresh is taking place (RHLDA asserted), CPU/refresh arbiter 316 monitors the HADS# and status lines from the host bus and the LOCM# signal from the MCC 212 (which indicates whether the access is to an address physically on the host bus or the system bus). If the CPU 210 does generate such an access, and it is to the system bus, the EBC 218 delays the start of the system bus cycle until after REFRQ goes low. CPU/refresh arbiter 316 in such a situation also asserts CPUMSSON to the CPU miss logic 314 which in turn asserts CPUMISS# to the ISP 216. The CPU in essence at that time is asserting a preemption request.

If the cycle detected on the host bus by the CPU/refresh arbiter 316 while the local DRAM refresh is taking place is to a local address on the host bus rather than to an address on the system bus, then the MCC delays the cycle only until the local DRAM refresh is complete. Thus the CPU can continue to access local memory while the refresh is taking place on the system bus. The time required to complete the cycle may be extended to accommodate the local DRAM refresh, hence HBRDY# may be delayed to the CPU.

DRAM controller 322 monitors the system bus REFRESH# line 308 and performs a CAS# before RAS# refresh of local memory in response to a REFRESH# falling edge. REFRESH# could be asserted either by the refresh controller 302 after arbitrating for the system bus, or by an ISA device 324 which otherwise controls the system resources as previously mentioned. In either case, DRAM controller 322 waits for the completion of any local DRAM access then taking place and then de-asserts MCCRDY until the CAS# before RAS# refresh of local DRAM completes.

Figure 1:
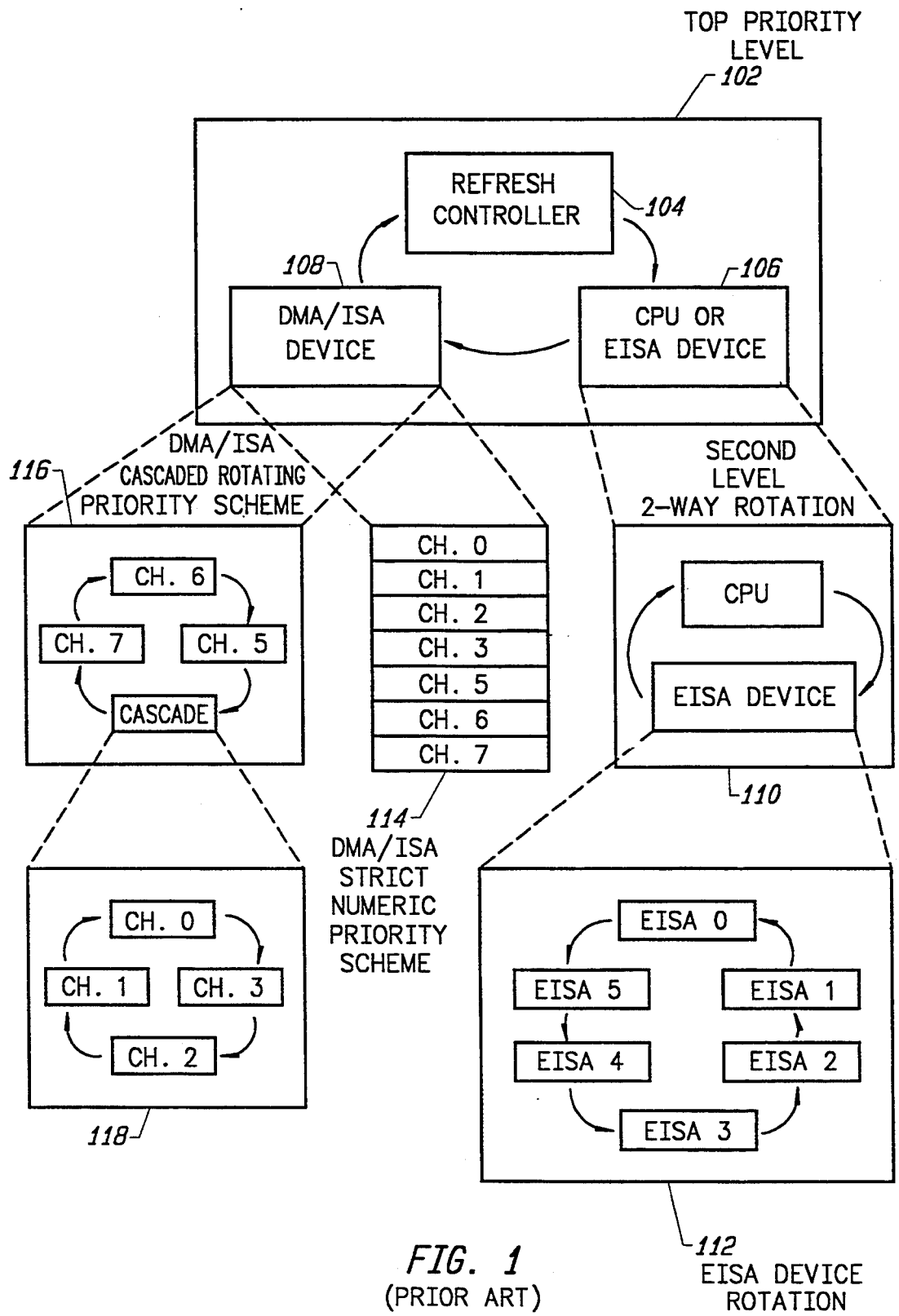
FIG. 1 illustrates a priority arbitration sequence as defined by the EISA specification.

Note that in the scheme of FIG. 3, the EISA arbitration priority as described with respect to FIG. 1 is disturbed in one specific case. In particular, when a refresh is taking place and both the CPU and an EISA master are requesting the bus, and the CPU (rather than an EISA master) was granted the bus last, the EISA-specified arbitration priority scheme requires the bus to be granted next to the EISA master. This could be accomplished through an additional signal from host hold logic 312 to the BOFF# input of the CPU 210 to force the CPU to abort its system bus request. In the scheme of FIG. 3, however, this feature is not implemented since it would require additional complexity, an additional pin connection on the EBC 218, and does not significantly affect performance or compatibility.

Figure 4:
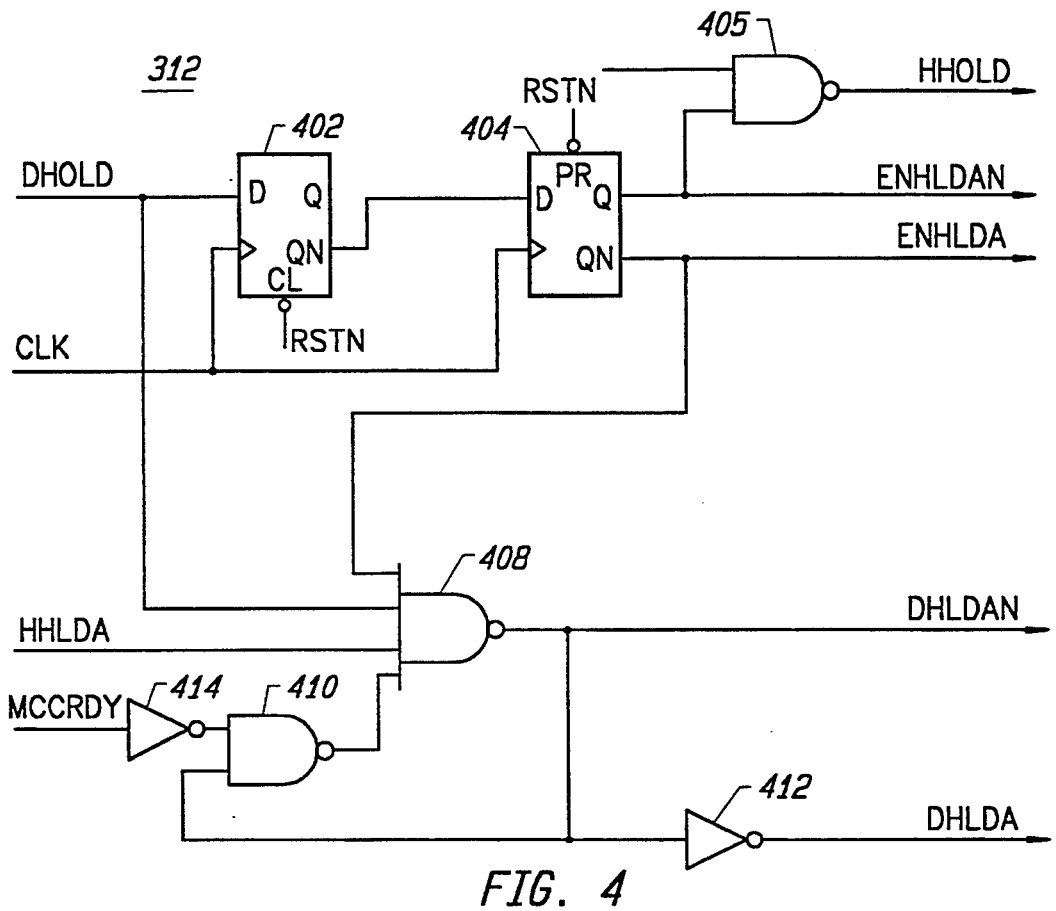
FIG. 4 is a logic diagram of the host hold logic in FIG. 3.

FIG. 4 is a simplified logic diagram of host hold logic 312 (FIG. 3). The DHOLD from top level arbiter 310 is connected to the D input of a flip-flop 402, the QN output of which is connected to the D input of a flip-flop 404. The clock inputs of both flip-flops 402 and 404 are connected to receive the host bus CLK signal, and the active low clear input of flip-flop 402 and the active low preset input of flip-flop 404 are connected to receive the RSTN reset signal. The QN output of flip-flop 404 forms an ENHLDA signal, and the Q output forms an ENHLDAN signal. ENHLDAN is connected to one input of a two-input NAND gate 406, the output of which forms the HHOLD signal provided to CPU 210. The other input of NAND gate 406 is connected to circuitry (not shown) which can activate HHOLD in situations unimportant for an understanding of the present invention. For the purposes of the present invention, this signal can be assumed to remain a steady logic 1.

DHOLD and ENHLDA are connected to two respective inputs of a four-input NAND gate 408. The third input of NAND gate 408 is connected to receive HHLDA from the CPU 210, and the fourth input is connected to the output of a two-input NAND gate 410. One input of NAND gate 410 is connected to receive MCCRDY from the DRAM controller 322 via an invertor 414, and the other input is connected to the output of NAND gate 408. The output of NAND gate 408 forms a DHLDAN signal, which is also inverted by an invertor 412 to provide the DHLDA signal provided to CPU miss logic 314 and the OR gate 318 (FIG. 3).

In operation, when host hold logic 312 receives DHOLD, flip-flops 402 and 404 synchronize DHOLD with the host bus CLK signal in order to generate HHOLD.

In response, before HHLDA is asserted by the CPU 210, NAND gate 408 outputs a logic 1 which in turn keeps DHLDA low (inactive). When the CPU 210 asserts HHLDA in response to HHOLD, since DHOLD and ENHLDA are both high, and assuming MCCRDY is also high, NAND gate 408 will output a logic 0. DHLDA will accordingly be asserted. When DHOLD is de-asserted, NAND gate 408 will return high and DHLDA will return low without waiting for the CPU 210 to de-assert HHLDA. If MCCRDY is low when CPU 210 returns HHLDA, NAND gate 410 will output a logic 0. In this case, DHLDA will not go active until MCCRDY returns high (active). Accordingly, the host hold logic of FIG. 4 will delay any DHLDA back to the top level arbiter 310 until after DRAM controller 322 signals over MCCRDY that any local DRAM refresh then taking place has been completed.

Figure 5:
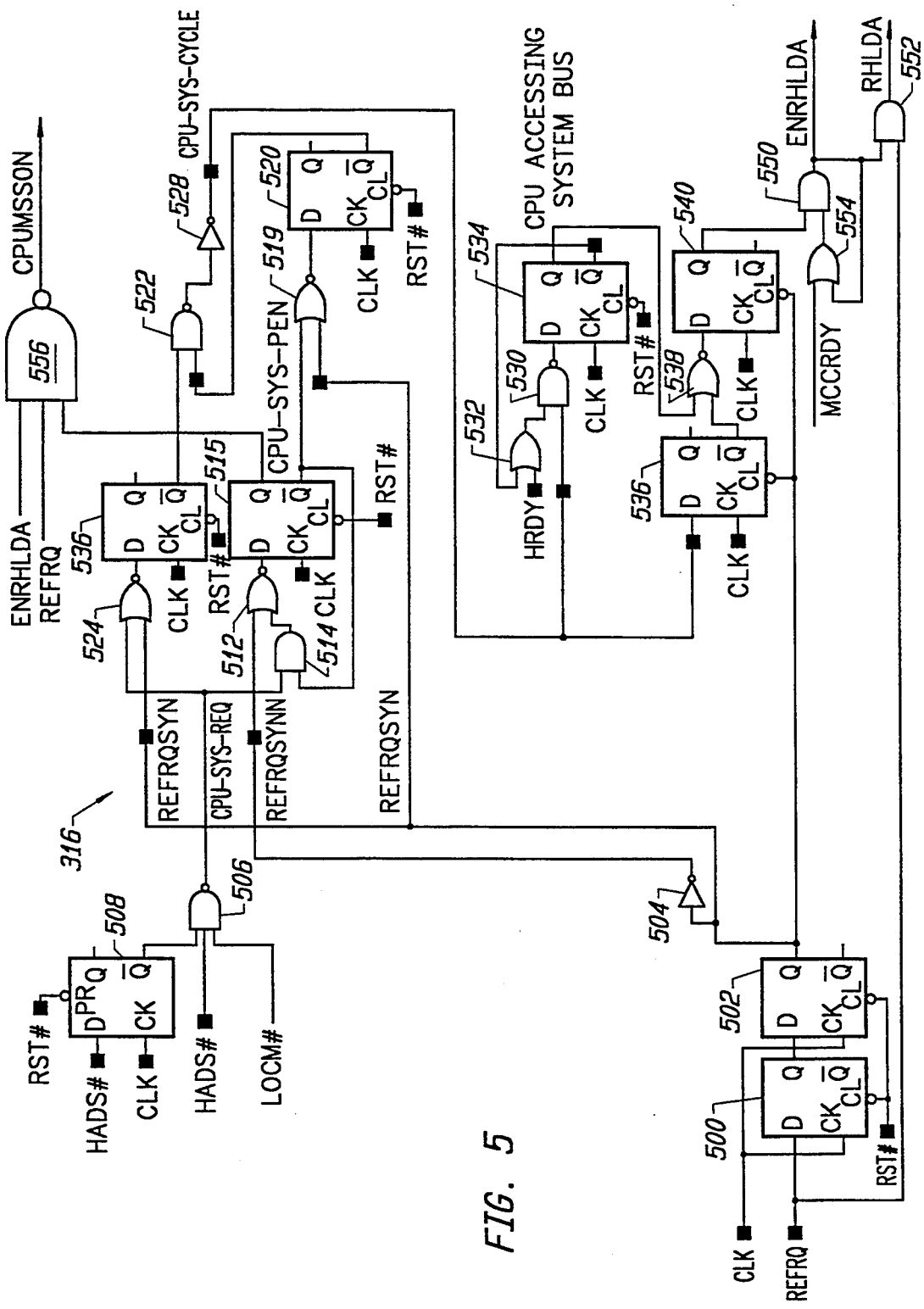
FIG. 5 is a simplified logic diagram of the CPU/refresh arbiter in FIG. 3.

FIG. 5 is a simplified logic diagram of CPU/refresh arbiter 316 (FIG. 3). In FIG. 5, the REFRQ signal from top level arbiter 310 (FIG. 3) is synchronized with the host bus CLK signal via flip-flops 500 and 502 to generate an REFRQSYN signal. REFRQSYN is inverted by invertor 504 to generate an REFRQSYNN signal. REFRQSYN is connected to one input of a two-input NOR gate 524, the other input of which is connected to the output of a NAND gate 506. The NAND gate 506 receives HADS# both directly and via a flip-flop 508, clocked by CLK, as well as receiving the LOCM# signal. The output of NAND gate 506 will go low in the first CLK cycle following HADS# and then will return high in the second CLK cycle following HADS#. The output of NAND gate 506 ("CPU-SYS-REQ") indicates that the CPU has initiated an access to an address located physically on the system bus. Assuming REFRQSYN is inactive (low) at that time, the output of NOR gate 524 will go high in the first CLK cycle following HADS# and return low in the second. That signal is provided to the D input of a flip-flop 526, the QN output of which will accordingly go low in the second CLK cycle following HADS# and return high in the third. The QN output of flip-flop 526 is provided to one input of a two-input NAND gate 522, the second input of which can be assumed to be high for present purposes. The output of NAND gate 522 is connected to the input of an invertor 528. The output of invertor 528, designated CPU-SYS-CYCLE, will therefore go low in the second CLK cycle following HADS# and return high in the third.

CPU-SYS-CYCLE is connected to one input of a two-input NAND gate 530, the second input of which can be assumed to be high for present purposes. The output of NAND gate 530 will therefore go high in the second CLK cycle following HADS#. This signal is provided to the D input of a flip-flop 534, the QN output of which will therefore transition from high to low in the third CLK cycle following HADS#. This signal is provided to one input of a two-input OR gate 532, the other input of which receives HRDY. Since HRDY is by this time inactive (low), since other circuitry in the EBC 218 has begun executing the CPU cycle in response to HADS#, the output of OR gate 532 will remain low until the cycle is completed and HRDY returns high. This maintains the output of NAND gate 530 at a logic 1, therefore keeping the QN output of flip-flop 534 low until the CLK cycle after HRDY returns active. Accordingly, the Q output of flip-flop 534 ("CPU-ACCESSING-SYSTEM-BUS", which is the complement of the QN output) goes high in the third CLK cycle following HADS# and does not return low until the CLK cycle after HRDY is asserted. This signal indicates that a CPU access to the system bus is in progress. The Q output of flip-flop 534 is connected to one input of a NOR gate 538, the other input of which is connected to the QN output of a flip-flop 536. The D input of flip-flop 536 is connected to receive the CPU-SYS-CYCLE signal, and the output of NOR gate 538 is connected to the D input of a flip-flop 540.

When REFRQSYS is inactive (low), flip-flops 536 and 540 are both continuously cleared. The Q output of flip-flop 540 is connected to one input of an AND gate 550, the output of which forms an ENRHLDA signal which is connected to one input of an AND gate 552. The other input of AND gate 552 receives REFRQ and the output forms the RHLDA output of CPU/refresh arbiter 316. ENRHLDA is also provided to one input of an OR gate 554, the other input of which receives MCCRDY. The output of OR gate 554 is connected to the other input of AND gate 550.

When REFRQSYN is low, and the Q output of flip-flop 540 is low, AND gate 550 will output a logic 0 regardless of the state of its other input. AND gate 552 similarly will output a logic 0 regardless of the state of its other input. When REFRQ goes high, REFRQSYN will go high two CLK cycles later and permit flip-flop 540 to load in a logic 1 if that is the signal on its D input. But the signal on the D input will be low while the CPU is accessing the system bus. Accordingly, the Q output of flip-flop 540 will not go high in response to REFRQ until the CLK cycle after the CPU completes its access on the system bus.

After the Q output of flip-flop 540 goes high, ENRHLDA still will not go high until MCCRDY also goes high. Thus ENRHLDA will be delayed also until the completion of any local DRAM refresh still taking place in response to a previous refresh cycle. Only when ENRHLDA goes high will AND gate 552 assert RHLDA in response to REFRQ.

If the output of NOR gate 524 goes low in response to HADS# while REFRQSYN is active, a logic I is not loaded into flip-flop 526. Instead, a logic 1 is loaded into a flip-flop 518 via a NOR gate 512. The QN output of flip-flop 518 is coupled back to the D input of flip-flop 518 via an AND gate 514 and NOR gate 512, thereby maintaining the logic I in flip-flop 518 until the CLK cycle after REFRQSYN returns inactive. The Q output of flip-flop 518 CCPU-SYS-PEN") therefore indicates that a CPU to system bus cycle is pending. This signal is provided to one input of a three-input NAND gate 556, the second input of which is connected to receive REFRQ and the third input of which is connected to receive ENRHLDA. The output of NAND gate 556 forms the CPUMSSON output of CPU/refresh arbiter 316. CPUMSSON therefore will go active when the CPU requires access to the system bus (while not being held by HHOLD/HHLDA) and a refresh is taking place on the system bus.

The QN output of flip-flop 518 is connected to a NOR gate 519, the other input of which is connected to receive REFRQSYN. The output of NOR gate 519 is connected to the D input of a flip-flop 520, the QN output of which is connected to the second input of NAND gate 522. When REFRQSYN is active (high), or CPU-SYS-PEN is inactive (low), flip-flop 520 will repeatedly load in a logic 0, thereby permitting NAND gate 522 to pass the QN output of flip-flop 526 through to the CPU-SYS-CYCLE signal line. However, when REFRQSYN returns low while a CPU-system cycle is pending, flip-flop 520 will load in a logic 1 in the immediately following CLK cycle. It will again load in a logic 0 on the next CLK cycle, since by that time the QN output of flip-flop 518 will have returned high. The QN output of flip-flop 520 will therefore exhibit a one CLK-cycle wide low going pulse after the end of a refresh operation during which the CPU initiated a cycle which required access to the system bus. That pulse will pass through NAND gate 522 and invertor 528 to generate a corresponding pulse on the CPU-SYS-CYCLE signal to start the required access across the system bus. The CPU-SYS-CYCLE signal is used by EBC 218 circuitry (not shown) to initiate that cycle. Some of the details of such circuitry are shown and described with respect to FIGS. 6, 7, 8, 9a, 9b, 9c, 9d, 12 and 13 U.S. Pat. No. 5,371,880, issued Dec. 6, 1994, entitled "Bus Synchronization Apparatus and Method", inventor Dipankar Bhattacharya. The CPU-SYS-CYCLE signal in the present FIG. 5 is designated SETSTRT in the latter application which is assigned to the assignee of the present invention and is incorporated herein by reference in its entirety.

Figure 6:
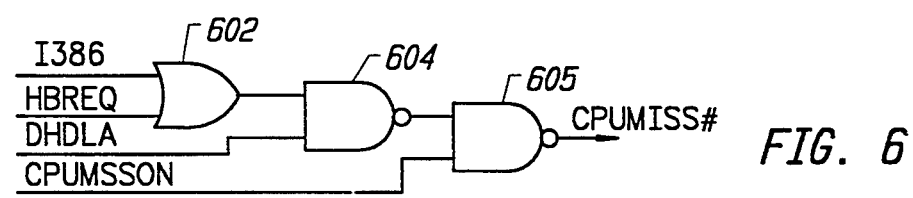
FIG. 6 is a logic diagram of the CPU miss logic in FIG. 3.

FIG. 6 is a logic diagram of the CPUMISS logic 314 (FIG. 3). HBREQ from CPU 210 is connected to one input of an OR gate 602, the other input of which is connected to receive and 1386 signal. 1386 is connected to a pin of EBC 218 which is strapped high if the CPU 210 is a 386-compatible CPU, and is strapped low if the CPU 210 is a 486-compatible CPU. The output of OR gate 602 is connected to one input of a NAND gate 604, the other input of which is connected to receive DHLDA. The output of NAND gate 604 is connected to one input of an AND gate 606, the other input of which is connected to receive CPUMSSON. The output of AND gate 606 forms the CPUMISS# signal provided to ISP 216.

In operation, it can be seen that CPUMISS# will go active whenever CPUMSSON is asserted by the CPU/refresh arbiter 316. CPUMISS# will be asserted also whenever DHLDA is asserted and the CPU is a 386-compatible CPU (which does not have an HBREQ output), and whenever DHLDA is active and a 486-compatible CPU asserts HBREQ.

Figure 7:
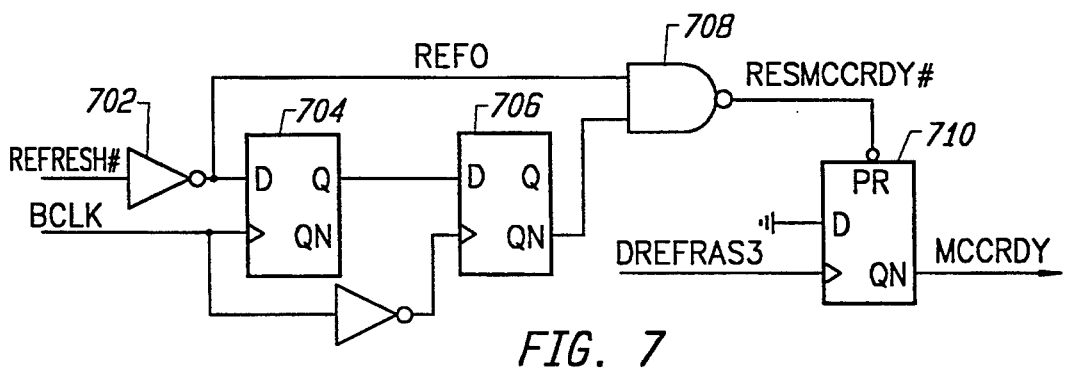
FIG. 7 is a logic diagram of a portion of the DRAM controller in FIG. 3.

FIG. 7 is a logic diagram of circuitry in DRAM controller 322 (FIG. 3) which may be used to generate MCCRDY. The REFRESH# signal is connected to the input an invertor 702, the output of which forms an REFO signal, connected to the D input of a flip-flop 704. The Q output of flip-flop 704 is connected to the D input of a flip-flop 706, and the flip-flops 704 and 706 are clocked on opposite edges of the system bus BCLK signal. The QN output of flip-flop 706 is connected to one input of a NAND gate 708, the other input of which receives REFO. The output of NAND gate 708 forms an RESMCCRDY# signal, which is connected to the active low preset input of a flip-flop 710. The D input of flip-flop 710 is connected to ground and the clock input is connected to receive a DREFRAS3 signal which is the last of the four RAS# signals to transition from low to high when a CAS# before RAS# refresh takes place in local DRAM.

In operation, flip-flops 704 and 706 generate a synchronized version of REFRESH# on the QN output of flip-flop 706. When REFRESH# goes active, REFO will go high. The QN output of flip-flop 706 is initially high, so RESMCCRDY# will therefore go low from the time REFO goes high until the next BCLK falling edge. This will preset flip-flop 710, thereby bringing MCCRDY low. When the CAS# before RAS# refresh completes, flip-flop 710 will load in a logic 0 from its D input and thereby bring MCCRDY back to its high (active) state.

In a system with a heavily loaded system bus, even with the EISA rotating arbitration priority scheme, the CPU may be starved for the shared resources. Accordingly, the EISA specification states that it may be desirable for the arbitration system to allow the CPU to continue to hold the bus for a period of time after preemption by another device. The EISA specification limits the maximum CPU bus holding time to 32 BCLK cycles following the preemption request.

Some chipsets may implement this feature by delaying HHOLD after arbitration by a fixed number of BCLKs, such as 32. However, this may be too long or too short, depending on the actual and changing need for the system bus by other bus masters. Delaying HHOLD by a fixed period after arbitration is, therefore, optimum in only one loading situation.

Accordingly, in the system of FIG. 2, the arbitration mechanism incorporates a programmable hold delay register and counter for delaying DHOLD by a programmable number of BCLK cycles after an EISA device wins the top level and CPU/EISA arbitration. DHOLD is not delayed if a DMA/ISA device wins the arbitration, since such devices are not designed to a specification which can tolerate a long delay between bus request and bus grant.

Figure 8:
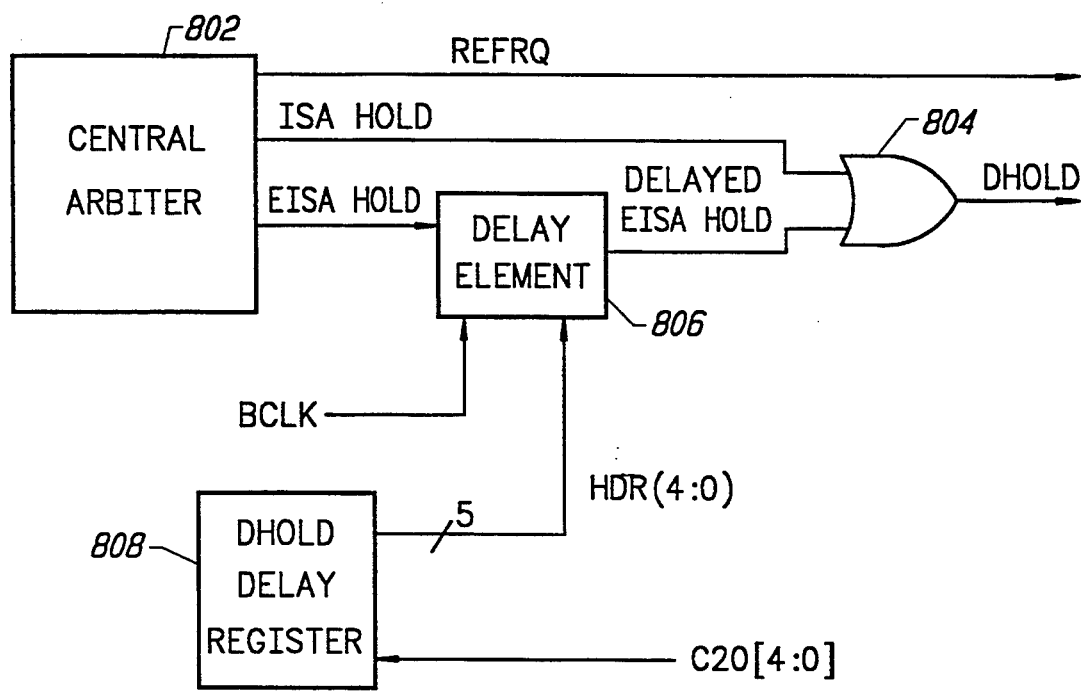
FIG. 8 is a block diagram of a portion of the combined top level arbiter and EISA arbitor in the ISP in FIG. 3.

FIG. 8 is a block diagram of a portion of the combined top level arbiter 310 and EISA arbiter 306 (FIG. 3) in the ISP 216. In FIG. 8, the top level and CPU/EISA arbitration function is represented by a central arbiter 802. The central arbiter 802 generates the REFRQ signal to EBC 218 as previously described, and also generates separate ISA and EISA hold signals. The ISA hold signal is connected to one input of an OR gate 804, the output of which provides DHOLD for the EBC 218. The EISA hold signal is provided to a delay element 806, the terminal count output of which is connected to the other input of OR gate 804. A DHOLD delay register 808, which is programmable by the CPU in I/O address C20h(4:0), is also provided. The five-bit output of DHOLD delay register 808 is coupled to an input port of delay element 806. Delay element 806 is clocked by the system bus BCLK.

In operation, if the refresh controller 302 wins the arbitration, central arbiter 802 asserts REFRQ as previously described. If a DMA/ISA arbiter wins the arbitration, the central arbiter 802 asserts ISA hold, which passes through OR gate 804 to assert DHOLD as previously described. If an EISA device wins the arbitration, then central arbiter 802 asserts EISA hold, which starts a counter in the delay element 806. The delay element 806 counts the number of BCLK cycles specified by the DHOLD delay register 808, and then asserts a delayed EISA hold signal via OR gate 804 to DHOLD.

Figure 9:
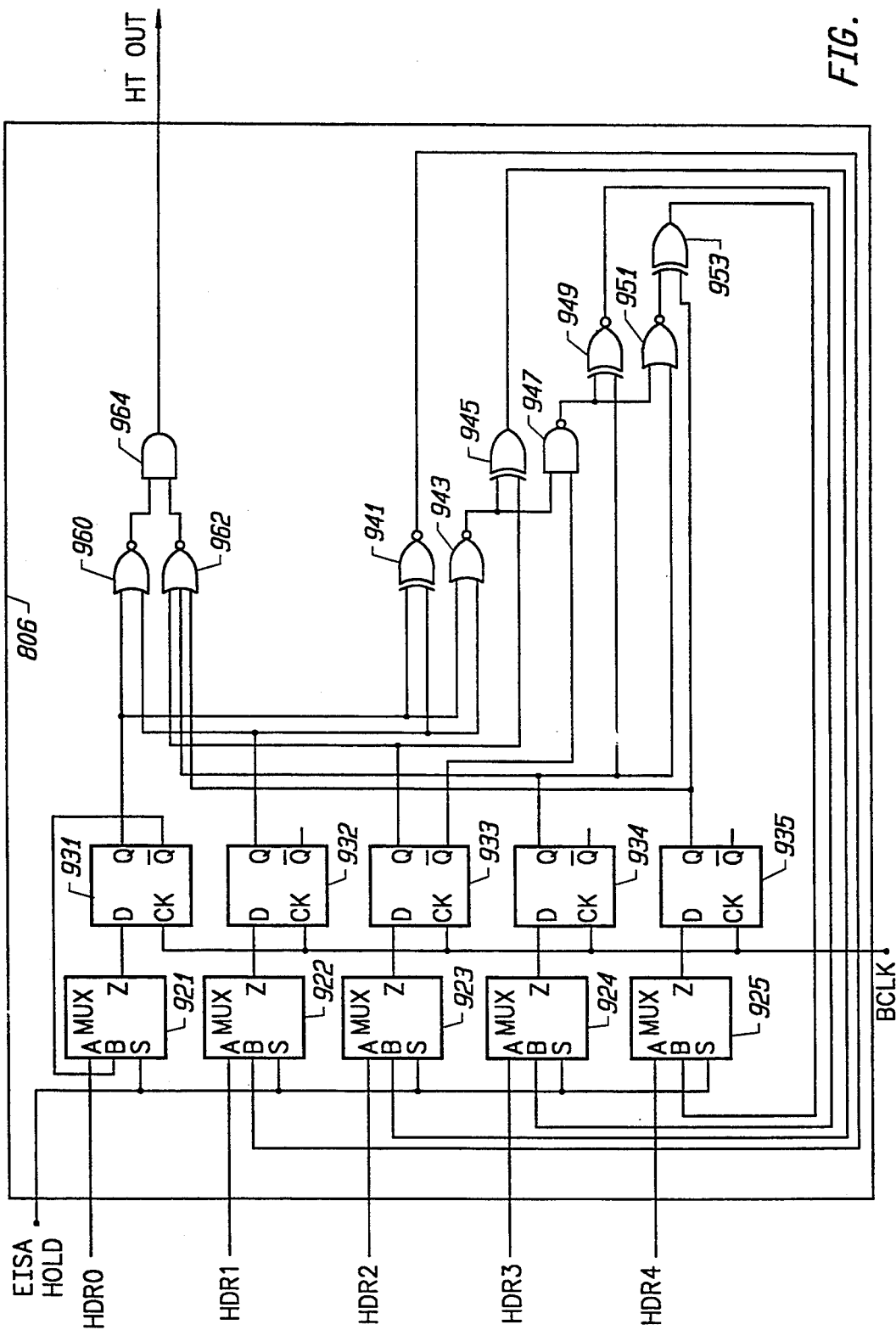
FIG. 9 is a logic diagram of a portion of the delay element in FIG. 8.

FIG. 9 is a logic diagram of a portion of delay element 806. The delay element 806 receives the Hold Delay Register outputs HDR0-HDR4 in respective A inputs of multiplexers 921-925. The Z output of multiplexers 921-925 are connected to the inputs of respective flip-flops 931-935. The Q and QN outputs of the flip-flops 931-935 are connected to combinational logic which is fed back into respective B input ports of multiplexers 921-925 to form a synchronous down counter. The Q outputs of flip-flops 931-935 are also provided to combinational logic to produce an HTOUT signal. The DELAYED EISA HOLD signal goes active when HTOUT goes active while EISA HOLD is active. It goes inactive when EISA HOLD goes inactive.

The EISA HOLD signal is received in the select (S) port of multiplexers 921-925. The EISA HOLD signal determines if the A input or the B input of multiplexers 921-925 will be coupled to output Z. If the EISA HOLD signal is 0, the delay hold register values HDR0-HDR4 will be continually selected, preventing the down counter from functioning and causing HTOUT (and hence the DELAYED EISA HOLD signal) to remain 0. If the EISA HOLD signal is 1, the B input ports of the multiplexers will be selected and the down counter will count from the value HDR0-HDR4 down to 0 causing HTOUT (and hence the DELAYED EISA HOLD signal) to become 1 when the count reaches 0. The DELAYED EISA HOLD signal remains asserted as long as EISA HOLD remains asserted.

The circuitry forming the down counter begins with the QN signal of flip-flop 931 being fed back to multiplexer 921 causing the Q output of flip-flop 931 to continuously toggle between 0 and 1 each BCLK during a down count.

The Q output of flip-flops 931 and 932 are connected to EXCLUSIVE-NOR gate 941 which has its output connected to the B input of multiplexer 922. The Q output of flip-flop 932 will thus be 1 on the next clock cycle of a down count if the Q outputs of flip-flops 931 and 932 are both either 0 or 1.

The Q output of flip-flops 931 and 932 are coupled to respective inputs of a NOR gate 943. The output of NOR gate 943 is connected to one input of EXCLUSIVE-OR gate 945 while the other input of EXCLUSIVE-OR gate 945 is connected to the Q output of flip-flop 933. The output of EXCLUSIVE-OR gate 945 is connected to the B input of multiplexer 923. The Q output of flip-flop 933 will thus be 1 on the next cycle of a down count if the Q outputs of flip-flops 931–933 are all 0, or the Q output of flip-flop 933 is 1 and the Q outputs of flip-flops 931 and 932 are not both 0.

The output of NOR gate 943 is also connected to one input of NAND gate 947 while the other input of NAND gate 947 is connected to the QN output of flip-flop 933. The output of NAND gate 947 is connected to one input of EXCLUSIVE-NOR gate 949. The other input of EXCLUSIVE-NOR gate 949 is connected to the Q output of flip-flop 934. The output of EXCLUSIVE-NOR gate is connected to multiplexer 924. The Q output of flip-flop 934 will thus be 1 on the next cycle of a down count if the Q outputs of flip-flops 931–934 are all 0, or the Q output of flip-flop 934 is 1 and the Q outputs of flip-flops 931–933 are not all 0.

The output of NAND gate 947 is also connected to one input of NOR gate 911. The other input of NOR gate 951 is connected to the Q output of flip-flop 934. The output of NOR gate 951 is connected to one input of EXCLUSIVE-OR gate 953, while the other input of EXCLUSIVE-OR gate 953 is connected to the Q output of flip-flop 935. The output of EXCLUSIVE-OR gate 953 is connected to multiplexer 925. The Q output of flip-flop 935 will thus be 1 on the next cycle of a down count if the Q outputs of flip-flops 931–935 are all 0, or the Q output of flip-flop 935 is 1 and the Q outputs of flip-flops 931–934 are not all 0.

The circuitry which generates the DELAYED EISA HOLD signal begins with NOR gates 960 and 962. NOR gate 960 receives the Q output of flip-flops 931 and 932. NOR gate 962 receives the Q output of flip-flops 933–935. The outputs of NOR gates 960 and 962 are connected to AND gate 964. The output of AND gate 964 is the DELAYED EISA HOLD signal. Thus, if the Q output of flip-flops 931–935 are all 0, indicating that a down count is complete, the DELAYED EISA HOLD signal will be 1. Otherwise, the DELAYED EISA HOLD signal will be 0.

The invention has been described with respect to particular embodiments thereof, and it will be understood that numerous modifications can be made without departing from the spirit and scope of the claims.

I claim:

1. A method for refreshing a local memory having a CAS# before RAS# refresh mode and a single-port memory controller, in a computer system having a CPU and a system bus, said system bus including a refresh control signal for initiating a refresh cycle on said system bus, a refresh of said local memory in said CAS# before RAS# refresh mode being faster than said refresh cycle on said system bus, comprising steps of:
   arbitrating among a plurality of requestors for said system bus, said requestors including said CPU, a refresh controller and an additional device;
   asserting said refresh control signal if said refresh controller is selected to access said bus in said arbitration;
   performing said CAS# before RAS# refresh on said local memory in response to said refresh control signal, after completion of any CPU access to local memory then taking place; and
   holding said CPU if said additional device is selected to access said bus in said arbitration but not if said refresh controller is selected to access said bus in said arbitration.

2. A method according to claim 1, wherein a CPU access to local memory is taking place when said refresh control signal is asserted, further comprising the step of holding a ready signal unasserted to said CPU after completion of said CPU access to local memory, until completion of said CAS# before RAS# refresh of local memory.

3. A method according to claim 2, further comprising the step of preventing the granting of said system bus to any requestor other than said CPU until completion of said CAS# before RAS# refresh of local memory.

4. A method for controlling access to a plurality of shared resources including a host bus, a system bus and local memory, by a plurality of requestors including a CPU, a refresh controller, and an other device, said other device being a member of a group consisting of at least one EISA device and at least one DMA/ISA device, said local memory having a single-port memory controller, comprising the steps of:
   arbitrating among said plurality of requestors to select a single requestor;
   granting control of said host bus, said system bus and said local memory to said selected requestor if said selected requestor is said CPU and if said selected requestor is said other device, but not if said winner is said refresh controller; and
   granting control of said system bus but not said host bus and not said local memory, to said selected requestor, if said selected requestor is said refresh controller.

5. A method according to claim 4, wherein said other device is one of said EISA devices, and wherein said step of arbitrating comprises a step of determining said selected requestor according to a rotation among (1) said refresh controller, if said refresh controller is requesting control of said system bus; and (2) an additional device, said additional device being a member of the group consisting of said CPU and said one EISA device, if said additional device is requesting control of said system bus.

6. A method according to claim 5, further comprising the step of determining said additional device by selecting, according to a rotation among (1) said CPU, if said CPU is requesting control of said system bus, and (2) said one EISA device, if said one EISA device is requesting control of said system bus.

7. A method according to claim 6, further comprising the step of selecting said one EISA device according to a rotation from among a plurality of said at least one EISA device, if said plurality of said at least one EISA device are among said plurality of requestors and are requesting control of said system bus.

8. A method according to claim 5, further comprising the step of granting control of said system bus to said CPU if neither said refresh controller nor any of said other devices is requesting control of said system bus.

9. A method according to claim 4, further comprising the step of performing a refresh operation on said local memory, in response to said selected requestor being said refresh controller, in a manner which ignores any address then being provided to said local memory.

10. A method according to claim 4, further comprising the steps of:
asserting a refresh signal in response to said step of granting control of said system bus if said selected requestor is said refresh controller; and
performing a refresh operation on said local memory, in response to assertion of said refresh signal, in a manner which ignores any address then being provided to said local memory.

11. A method according to claim 11, wherein said step of performing a refresh operation comprises the step of performing a CAS#-before-RAS# refresh operation on said local memory.

12. A method according to claim 4, further comprising the steps of:
coupling address signals between said system bus and said host bus in response to said step of granting control of said host bus, said system bus and said local memory to said selected requestor, if said selected requestor is not said refresh controller; and
coupling first and second different addresses onto said system bus and said host bus, respectively, in response to said step of granting control of said system bus to said selected requestor if said selected requestor is said refresh controller.

13. A method according to claim 4, further comprising, if said selected requestor is said refresh controller, the step of delaying said step of granting control of said system bus to said refresh controller, until after completion of any CPU access to said system bus then taking place, and until after completion of any prior local memory refresh then taking place.

14. A method according to claim 13, further comprising, if said selected requestor is said other device, the steps of:
requesting control of said host bus from said CPU; and
delaying said step of granting control of said host bus, said system bus and said local memory, until after said CPU relinquishes control of said host bus.

15. A method according to claim 14, further comprising, if said selected requestor is said other device, the step of delaying said step of granting control of said host bus, said system bus and said local memory, until after completion of any local memory refresh then taking place.

16. A method according to claim 4, further comprising the steps of:
performing a refresh operation on said local memory in response to said selected requested being said refresh controller;
detecting an access by said CPU to said local memory while said local memory refresh operation is taking place; and
delaying said access by said CPU to said local memory until after completion of said local memory refresh operation.

17. A method according to claim 16, further comprising the steps of:
performing a refresh operation on said system bus in response to said selected requestor being said refresh controller; and
allowing said access to said local memory by said CPU after completion of said local memory refresh operation and before completion of said system bus refresh operation.

18. A method according to claim 4, further comprising the steps of:
performing a refresh operation on said system bus in response to said selected requestor being said refresh controller;
detecting an access by said CPU to said system bus while said system bus refresh operation is taking place; and
delaying said access to said system bus until after completion of said system bus refresh operation.

19. A method according to claim 14 wherein said other device is one of said DMA/ISA devices, and wherein said step of arbitrating comprises a step of determining said selected requestor according to a rotation among (1) said refresh controller, if said refresh controller is requesting control of said system bus; and (2) said one DMA/ISA device, if said one DMA/ISA device is requesting control of said system bus.

20. A method for controlling access to a plurality of shared resources including a host bus, a system bus and local memory, by a plurality of devices including a CPU and a refresh controller, said local memory having a single-port memory controller, comprising the steps of:
arbitrating among said plurality of devices according to a rotation among devices in said plurality of devices to select a single device to access said shared resources, said rotation including said CPU and said refresh controller;
granting control of said host bus, said system bus and said local memory to said selected device if said selected device is said CPU; and
granting control of said system bus but not said host bus and not said local memory, to said selected device if said selected device is said refresh controller.

21. A method according to claim 20, wherein said plurality of devices further includes an additional device, said rotation further including said additional device, further comprising the step of granting control of said host bus, said system bus and said local memory to said selected device if said selected device is said additional device.

22. A method according to claim 21, further comprising the step of performing a refresh operation on said local memory, in response to said selected device being said refresh controller, in a manner which ignores any address then being provided to said local memory.

23. A method according to claim 21, further comprising the steps of:
asserting a refresh signal in response to said step of granting control of said system bus if said selected device is said refresh controller; and
performing a refresh operation on said local memory, in response to assertion of said refresh signal, in a manner which ignores any address then being provided to said local memory.

24. A method according to claim 23, wherein said step of performing a refresh operation comprises the step of performing a CAS#-before-RAS# refresh operation on said local memory.

25. A method according to claim 21, further comprising the steps of:
coupling address signals between said system bus and said host bus in response to said selected device not being said refresh controller; and
coupling first and second different addresses onto said system bus and said host bus, respectively, in response to said selected device being said refresh controller.

26. A method according to claim 21, further comprising, if said selected device is said refresh controller, the step of delaying said step of granting control of said system bus to said refresh controller, until after completion of any CPU access to said system bus then taking place, and Until after completion of any prior local memory refresh then taking place.

27. A method according to claim 26, further comprising, if said selected device is said additional device, the steps of:
requesting control of said host bus from said CPU; and
delaying said step of granting control of said host bus, said system bus and said local memory, until after said CPU relinquishes control of said host bus.

28. A method according to claim 27, further comprising, if said selected device is said additional device, the step of delaying said step of granting control of said host bus, said system bus and said local memory, until after completion of any local memory refresh operation then taking place.

29. A method according to claim 20, further comprising the steps of:
performing a refresh operation on said local memory in response to said selected device being said refresh controller;
detecting an access by said CPU to said local memory while said local memory refresh operation is taking place; and
delaying said access by said CPU to said local memory until after completion of said local memory refresh operation.

30. A method according to claim 29, further comprising the steps of:
performing a refresh operation on said system bus in response to said selected device being said refresh controller; and
allowing said access to said local memory by said CPU after completion of said local memory refresh operation and before completion of said system bus refresh operation.

31. A method for controlling access to a plurality of shared resources including a host bus, a system bus and local memory, by a plurality of devices including a refresh controller and a first additional device, said local memory having a single-port memory controller, comprising the steps of:
selecting from said plurality of devices a single device to access said shared resources according to a rotation among said plurality of devices in response to a request by at least one of said plurality of devices;
requesting that a CPU which controls said host bus relinquish said host bus if said selected device is said first additional device;
granting control of said host bus, said system bus and said local memory to said selected device if said selected device is said first additional device, in response to an acknowledgement by said CPU of having relinquished said host bus; and
granting control of said system bus but not said host bus, to said selected device, if said selected device is said refresh controller, in response to an acknowledgement that said system bus is available.

32. A method according to claim 31, further comprising the step of determining said first additional device according to a rotation among (1) said CPU, if said CPU is requesting control of said system bus, and (2) an EISA device, if an EISA device is requesting control of said system bus.

33. A method according to claim 31, wherein said plurality of devices further includes a second additional device, further comprising the steps of:
requesting that said CPU relinquish said host bus if said selected device is said second additional device; and
granting control of said host bus, said system bus and said local memory to said selected device, if said selected device is said second additional device, in response to an acknowledgement by said CPU of having relinquished said host bus.

34. A method according to claim 31, further comprising the step of delaying said steps of granting control of said host bus, said system bus and said local memory, until after completion of any local memory refresh operation then taking place.

35. A method according to claim 34, further comprising the step of delaying said step of granting control of said system bus, until after completion of any CPU access to said system bus then taking place.

36. A method according to claim 35, further comprising, in response to said step of granting control of said system bus to said refresh controller, the step of performing a local memory refresh after completion of any CPU access to said local memory then taking place.

37. A method according to claim 36, wherein said step of performing a local memory refresh comprises the step of withholding a completion signal from said CPU until after completion of said local memory refresh.

38. A method according to claim 37, further comprising the step of performing a refresh on said system bus in response to said step of granting control of said system bus to said refresh controller.

39. Apparatus for controlling access to a plurality of shared resources including a host bus, a system bus and local memory having a single-port memory controller, for use with a refresh controller at least one additional device, and a CPU having a hold request input and a hold acknowledge output, comprising:
first arbitration means for selecting a device in response to requests for control of said system bus from at least one of said refresh controller and said additional device, said arbitration means having first and second hold request outputs and at least one hold acknowledge input, said arbitration means activating said first output if said selected device is said additional device, and activating said second output but not said first output if said selected device is said refresh controller;
means for coupling a signal on said first hold request output to said hold request input of said CPU and coupling a signal from said hold acknowledge output of said CPU to said hold acknowledge input of said first arbitration means; and
second arbitration means, coupled to said CPU and to said second hold request output of said first arbitration means, for selecting between said CPU and said selected device of said first arbitration means for control of said system bus in response to activation of said second hold request output of said first arbitration means, said second arbitration means activating said hold acknowledge input of said first arbitration means when control of said system bus is to be granted to said selected device over said CPU;

means for asserting a refresh control signal if said selected device is said refresh controller;

means for performing a refresh on said local memory in response to said refresh control signals after completion of any CPU access to local memory then taking place; and means for holding said CPU if said selected device is said additional device but not if said selected device is said refresh controller.

40. Apparatus according to claim 39, wherein said second arbitration means selects between said CPU and said selected device on a first-come-first-served basis.

41. Apparatus according to claim 39, wherein said second arbitration means comprises:

first delaying means for delaying said activation of said hold acknowledge input of said first arbitration means until after completion of any CPU access to said system bus then taking place; and second delaying means for delaying any subsequent CPU access to said system bus until after said selected device relinquishes control of said system bus.

42. Apparatus according to claim 41, wherein said first arbitration means comprises means for deactivating said second hold request output after said selected device relinquishes control of said system bus, and wherein said second delaying means comprises means for delaying any subsequent CPU access to said system bus until after said second hold request output of said first arbitration means is deactivated.

43. Apparatus according to claim 41, wherein said second arbitration means further comprises third delaying means for delaying said activation of said hold acknowledge input of said first arbitration means until after completion of any local memory refresh operation then taking place.

44. Apparatus according to claim 39, wherein said means for coupling comprises means for delaying said coupling of a signal from said hold acknowledge output of said CPU to said hold acknowledge input of said first arbitration means until after completion of any local memory refresh operation then taking place.

45. A method for controlling access to a plurality of shared resources including a host bus, a system bus and local memory having a single-port memory controller, by a plurality of requestors including a CPU, a refresh controller, and EISA devices, comprising the steps of:

arbitrating among said plurality of requestors to select a single requestor to access said shared resources according to a rotation among (1) said refresh controller, if said refresh controller is requesting control of said system bus; and (2) an additional device, said additional device being a member of the group consisting of said CPU and one of said EISA devices, if said additional device is requesting control of said system bus;

determining said additional device according to a rotation among (1) said CPU, if said CPU is requesting control of said system bus, and (2) said one EISA device, if said one EISA device is requesting control of said system bus;

determining said one EISA device according to a rotation from among a plurality of said EISA devices if said EISA devices are requesting control of said system bus;

requesting control of said host bus from said CPU if said selected requestor is not said refresh controller and is not said CPU;

granting control of said host bus, said system bus and said local memory to said selected requestor in response to said CPU relinquishing control of said host bus if said selected requestor is not said refresh controller, after completion of any local memory refresh then taking place;

coupling address signals between said system bus and said host bus in response to said step of granting control of said host bus, said system bus and said local memory to said selected requestor if said selected requestor is not said refresh controller;

granting control of said system bus but not granting control of said host bus and not granting control of said local memory, to said selected requestor, if said selected requestor is said refresh controller, after completion of any CPU access to said system bus then taking place, and after completion of any prior local memory refresh then taking place;

asserting a refresh signal in response to said step of granting control of said system bus to said refresh controller;

performing a refresh operation on said system bus in response to said assertion of said refresh signal; and performing a CAS#-before-RAS# refresh operation on said local memory in response to assertion of said refresh signal.

46. A method according to claim 45, further comprising the steps of:

detecting an access by said CPU to said local memory while said local memory refresh operation is taking place;

delaying said access to said local memory until after completion of said local memory refresh operation;

detecting an access by said CPU to said system bus while said system bus refresh operation is taking place; and delaying said access to said system bus until after completion of said system bus refresh operation.

47. A method according to claim 45, further comprising the step of arbitrating between said CPU and said selected requestor for control of said system bus if said selected requestor is said refresh controller.

48. Apparatus for controlling access to a plurality of shared resources including a host bus, a system bus and local memory having a single-port memory controller, for use with a CPU having a hold request input and a hold acknowledge output, a refresh controller and at least first and second additional devices, comprising:

first arbitration means for selecting a device in response to requests for control of said system bus from at least one of said refresh controller and said additional devices, said arbitration means having first and second hold request outputs and at least one hold acknowledge input, said arbitration means activating said first output if said selected device is one of said additional devices, and activating said second output but not said first output if said selected device is said refresh controller;

means for coupling a signal on said first hold request output to said hold request input of said CPU and, after completion of any local memory refresh operation then taking place, coupling a signal from said hold acknowledge output of said CPU to said hold acknowledge input of said first arbitration means; and second arbitration means, coupled to said CPU and to said second hold request output of said first arbitration means, for selecting between said CPU and said selected device of said first arbitration means for control of said system bus in response to activation of said second hold request output of said first arbitration means, said second arbitration means activating said hold acknowledge input of said first arbitration means after completion of any CPU access to said system bus then taking place, and after completion of any local memory refresh operation then taking place, said second arbitration means further comprising means for delaying any subsequent CPU access to said system bus until after said selected device relinquishes control of said system bus;

means for asserting a refresh control signal if said selected device is said refresh controller;

means for performing a refresh on said local memory in response to said refresh control signal, after completion of any CPU access to local memory then taking place; and means for holding said CPU if said selected device is said additional device but not if said selected device is said refresh controller.

49. Apparatus according to claim 48, wherein said first arbitration means comprises means for deactivating said second hold request output after said selected device relinquishes control of said system bus, and wherein said delaying means comprises means for delaying any subsequent CPU access to said system bus until after said second hold request output of said first arbitration means is deactivated.

50. A method according to claim 4 wherein said other device is one of said EISA devices, and wherein said plurality of requestors further includes one of said DMA/ISA devices, wherein said step of arbitrating comprises a step of determining said selected requestor according to a rotation among (1) said refresh controller, if said refresh controller is requesting control of said system bus; (2) said one DMA/ISA device, if said one DMA/ISA device is requesting control of said system bus; and (3) an additional device, said additional device being a member of the group consisting of said CPU and said one EISA device, if said additional device is requesting control of said system bus.

51. A method according to claim 45, wherein said plurality of requestors further includes at least one DMA/ISA device, and wherein said rotation in said step of arbitrating is further among one of said DMA/ISA devices.

* * * * *

UNITED STATES PATENT AND TRADEMARK OFFICE
CERTIFICATE OF CORRECTION

PATENT NO. : 5,448,742
DATED : September 5, 1995
INVENTOR(S) : Dipankar Bhattacharya It is certified that error appears in the above-indentified patent and that said Letters Patent is hereby corrected as shown below:

Claim 11, Column 55, Line 19:
After "claim" and before "wherein"
delete "11" and substitute therefor
-- 10 --.

Claim 19, Column 56, Line 18: After "claim" and before "wherein" delete "14" and substitute therefor -- 4 --.

Claim 26, column 57, line 15: After "place, and" and before "after completion" delete "Until" and substitute therefor -- until --.

Signed and Sealed this

Twelfth Day of December, 1995

Attest:

BRUCE LEHMAN

*Attesting Officer*    *Commissioner of Patents and Trademarks*